(12) United States Patent
Liu et al.

(10) Patent No.: US 12,233,996 B1
(45) Date of Patent: Feb. 25, 2025

(54) UNDERWATER SUBMERSIBLE ROBOT AND CONTROL METHOD AND CONTROL APPARATUS THEREFOR

(71) Applicant: Guangzhou University, Guangzhou (CN)

(72) Inventors: Airong Liu, Guangzhou (CN); Jiaqiao Liang, Guangzhou (CN); Jiyang Fu, Guangzhou (CN); Jiajian Liang, Guangzhou (CN); Bingcong Chen, Guangzhou (CN); Hai Lin, Guangzhou (CN); Jialin Wang, Guangzhou (CN); Jiawei He, Guangzhou (CN); Fobao Zhou, Guangzhou (CN); Yixiao Zhang, Guangzhou (CN); Haoxiang Zhou, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/620,130

(22) Filed: Mar. 28, 2024

(30) Foreign Application Priority Data

Nov. 16, 2023 (CN) .......................... 202311524619.8

(51) Int. Cl.
| | |
|---|---|
| *B63G 8/14* | (2006.01) |
| *B63G 8/00* | (2006.01) |
| *B63G 8/04* | (2006.01) |
| *B63G 8/08* | (2006.01) |
| *G05D 1/49* | (2024.01) |
| *G05D 1/606* | (2024.01) |
| *G05D 109/30* | (2024.01) |

(52) U.S. Cl.
CPC .............. *B63G 8/14* (2013.01); *B63G 8/001* (2013.01); *B63G 8/04* (2013.01); *B63G 8/08* (2013.01); *G05D 1/49* (2024.01); *G05D 1/606* (2024.01); *G05D 2109/38* (2024.01)

(58) Field of Classification Search
CPC . B63G 8/14; B63G 8/001; B63G 8/04; B63G 8/08; G05D 1/49; G05D 1/606; G05D 2109/38

USPC .......................................................... 701/21
See application file for complete search history.

(56) References Cited

U.S. PATENT DOCUMENTS

| | | | | |
|---|---|---|---|---|
| 6,056,237 A | * | 5/2000 | Woodland ................ | B64D 1/02 |
| | | | | 244/49 |
| 2021/0101666 A1 | * | 4/2021 | Alam ....................... | B63G 8/16 |
| 2023/0125682 A1 | * | 4/2023 | Yu ........................... | B63C 11/52 |
| | | | | 114/312 |

FOREIGN PATENT DOCUMENTS

CN 114455039 A * 5/2022

\* cited by examiner

*Primary Examiner* — Tyler D Paige
(74) *Attorney, Agent, or Firm* — Getech Law LLC; Jun Ye

(57) ABSTRACT

A method includes: calculating a first difference between a current actual attitude of a fuselage and a desired attitude and a second difference between an actual depth and a desired depth; inputting the first difference and the second difference into a set terminal sliding mode surface to obtain an output value of the terminal sliding mode surface; using the output value as an input of a preset high-order observer, a radial basis function neural network and a terminal sliding mode control law, respectively, and using an output of the high-order observer and an output of the radial basis function neural network as a compensation input of the terminal sliding mode control law; performing power distribution for each propeller of a propeller assembly on the basis of the virtual force to obtain a propelling force of each propeller; and controlling the propellers of the underwater submersible robot.

10 Claims, 14 Drawing Sheets

UNDERWATER SUBMERSIBLE ROBOT AND CONTROL METHOD AND CONTROL APPARATUS THEREFOR

TECHNICAL FIELD

The present invention relates to the technical field of robot control, in particular to an underwater submersible robot and a control method and control apparatus therefor.

BACKGROUND

At present, the society has a huge demand for the construction of various underwater engineering such as water-related infrastructure and marine resource development facilities, and the construction of underwater engineering such as river-spanning and sea-spanning bridges, marine ranching, offshore wind power and offshore drilling platforms is indispensable. These important engineering facilities must be regularly maintained and overhauled during use in order to avoid major casualties and serious economic losses while ensuring the normal operation of transportation, resource development and other major projects. For example, as the main load-bearing member of the underwater engineering structure, an underwater pile foundation directly bears the load transmitted by the superstructure of the underwater engineering, so the health condition thereof is crucial. Efficient and accurate underwater pile foundation detection techniques may provide critical engineering information for determining the safety and reliability of the underwater engineering and guiding maintenance and repair work. However, the complexity and risk of engineering detections are greatly increased by the special and extreme conditions of the underwater environment, such as high pressure and turbulent impacts. Complex flow environments, such as high current velocities, may easily cause, disturbance and misjudgment of detection results.

A traditional underwater engineering detection method requires to send divers down to carry out the detection, which faces many difficulties. Firstly, there are many unknown risks in underwater work, which pose a direct threat to the life safety of divers. Secondly, the working time of divers is limited and unable to satisfy the needs of long-time underwater work, and the dive depth is physiologically limited. In addition, it is difficult to find defects of underwater engineering by visual detection. The combination of these defects makes it impossible to accurately obtain the health condition of underwater pile foundations in time, and makes it difficult to deal with related risks in advance. Therefore, in recent years, the use of underwater robots to inspect underwater engineering has emerged.

Although the rapid development of underwater robot technology provides more reliable engineering equipment for underwater engineering detection, at present, the common underwater movement control mode of underwater detection robots is mainly to move underwater at a set speed, which has poor anti-disturbance capacity against underwater turbulence, poor maneuverability, insufficient stability and other problems. Therefore, there is an urgent need for an underwater robot that may solve the above problems.

SUMMARY

Embodiments of the present invention provide an underwater submersible robot and a control method and control apparatus therefor, which may improve the anti-disturbance capacity of the underwater submersible robot against underwater turbulence.

An embodiment of the present invention provides an underwater submersible robot. The underwater submersible robot includes:
  a fuselage;
  a detection apparatus, disposed on the fuselage and configured to detect an underwater target;
  a propeller assembly, disposed on the fuselage and configured to drive the underwater submersible robot underwater;
  a sensing apparatus, disposed on the fuselage and configured to sense an attitude and depth of the fuselage; and
  a control apparatus, disposed on the fuselage, connected to the detection apparatus, the sensing apparatus and the propeller assembly, and configured to:
  calculate a first difference between a current actual attitude of the fuselage and a desired attitude and a second difference between an actual depth and a desired depth;
  input the first difference and the second difference into a set terminal sliding mode surface to obtain an output value of the terminal sliding mode surface;
  use the output value as an input of a preset high-order observer, a radial basis function neural network and a terminal sliding mode control law, respectively, and use an output of the high-order observer and an output of the radial basis function neural network as a compensation input of the terminal sliding mode control law to obtain a virtual force outputted by the terminal sliding mode control law;
  perform power distribution for each propeller of the propeller assembly on the basis of the virtual force to obtain a propelling force of each propeller; and
  control a propelling operation of the propellers on the basis of the propelling force.

As an improvement on the above solution, the control apparatus, when configured to perform power distribution for each propeller of the propeller assembly on the basis of the virtual force to obtain a propelling force of each propeller, is specifically configured to:
  filter the virtual force using a second-order filter, and convert the filtered virtual force into the propelling force of each propeller of the propeller assembly by power distribution.

As an improvement on the above solution, the propeller assembly includes four propellers, the four propellers are disposed at two ends of two sides of the fuselage respectively in a manner of rotating up and down and left and right, and the four propellers are connected to the control apparatus.

As an improvement on the above solution, the fuselage includes a main body compartment, two alloy skeletons and two streamlined shells; the two alloy skeletons are disposed on two sides of the main body compartment respectively in a manner of rotating around an axial direction of the main body compartment; and the two streamlined shells enclose the two alloy skeletons in a one-to-one correspondence manner and are correspondingly connected to the two alloy skeletons.

As an improvement on the above solution, the main body compartment includes, in a lengthwise direction, a detection head cover, a coupling portion, a control compartment shell, a special-shaped compartment, a control compartment cover, a battery compartment cover, a battery compartment shell, a compartment cover transition section, and a grip connected in sequence;

the interior of the control compartment shell is used for accommodating the control apparatus, the interior of the detection head cover is used for accommodating the detection apparatus, and the interior of the battery compartment cover is used for accommodating a battery compartment;

a portion of the coupling portion in contact with the control compartment shell and a portion of the coupling portion in contact with the detection head cover are provided with annular grooves along an outer periphery of the coupling portion, O-shaped seal rings are mounted in the annular grooves, the portions of the coupling portion extend into the detection head cover and the special-shaped compartment and fit tightly, and the portions of the coupling portion extending into the detection head cover and the special-shaped compartment are provided with jackscrews;

a portion of the special-shaped compartment in contact with the control compartment shell is provided with an annular groove with an O-shaped seal ring, and an outer periphery of the special-shaped compartment is concave to form a plurality of tables for mounting of watertight joints; the sensing apparatus is disposed in the special-shaped compartment and leads out wires by means of the watertight joints;

a middle position of the control compartment cover is concave to form an accommodation slot for accommodating a male socket plug connected to the battery compartment cover; a middle position of the battery compartment cover is concave to form an accommodation slot for accommodating a female socket plug in plugged connection with the male socket plug; an O-shaped seal ring is disposed between connecting portions of the battery compartment cover and the battery compartment shell, and a battery platform is provided inside the battery compartment cover for placement of a battery; and an O-shaped seal ring and a jackscrew are provided at a connecting position of one end of the compartment cover transition section and the battery compartment shell, and the grip is provided at the other end of the compartment cover transition section.

As an improvement on the above solution, the alloy skeletons include head skeletons, middle skeletons, and tail skeletons disposed in sequence along the lengthwise direction of the main body compartment; the head skeletons, the middle skeletons and the tail skeletons are connected to two ends of two sides of the main body compartment respectively by means of the coupling portion, and the main body compartment is connected to the corresponding streamlined shells by means of the head skeletons, the middle skeletons and the tail skeletons; and an expansion skeleton is disposed at a bottom of the main body compartment, and holes are reserved in the expansion skeleton for mounting of an expansion module.

As an improvement on the above solution, the underwater submersible robot further includes a mounting bottom plate and at least two adaptive magnetization modules;

the mounting bottom plate is used for being removably connected to the fuselage, and the at least two adaptive magnetization modules are connected to two sides of the mounting bottom plate;

each of the adaptive magnetization modules includes: a lifting plate, a first small hydraulic rod, a second small hydraulic rod, a magnetization fixing module, a bearing plate, a second large hydraulic rod, a first large hydraulic rod, an adaptive adjustment holding mechanism, and a bottom connecting skeleton;

an included angle formed by each of two sides of the bearing plate and a middle position of the bearing plate is an obtuse angle, and bottom sides of the two sides of the bearing plate are each connected to the magnetization fixing module by means of at least one set of first small hydraulic rod and second small hydraulic rod; the first small hydraulic rod is connected to the second small hydraulic rod in a hydraulic driving manner; and top sides of the two sides of the bearing plate are each connected to the mounting bottom plate by means of at least one set of second large hydraulic rod and first large hydraulic rod, and the first large hydraulic rod is connected to the second large hydraulic rod in a hydraulic driving manner.

As an improvement on the above solution, the underwater submersible robot further includes two pairs of motion assisting modules disposed on two sides of the fuselage; and each of the motion assisting modules includes a fixing support, a motor, and a spoiler, wherein the fixing support is disposed on one side of the fuselage, the spoiler is disposed on the fixing support in a manner of rotating up and down, and the motor is disposed on the fuselage and used for driving the spoiler to move up and down.

As an improvement on the above solution, the detection apparatus includes an underwater vision matrix module; the underwater vision matrix module includes: a matrix collar and at least two camera adjustment assemblies; the matrix collar is used for being removably mounted on the fuselage, and the at least two camera adjustment assemblies are uniformly distributed on a same side of the matrix collar; and each of the camera adjustment assemblies includes: a linear actuator, a clamping plate, a waterproof motor, a waterproof camera, a motion frame, and a hinged motion frame, wherein a bottom end of the hinged motion frame is hinged to the matrix collar, a top end of the hinged motion frame is provided with the waterproof motor, a free end of a rotating shaft of the waterproof motor is provided with the waterproof camera, one end of the clamping plate is connected to a middle position of the hinged motion frame, the other end of the clamping plate is connected to one end of the motion frame, the other end of the motion frame is connected to one end of the clamping plate of another camera adjustment assembly, the other end of the clamping plate of another camera adjustment assembly is connected to the middle position of the hinged motion frame of the camera adjustment assembly, the linear actuator is disposed on the matrix collar, and a free end of a push rod of the linear actuator is connected to a middle position of the motion frame.

As an improvement on the above solution, the underwater submersible robot further includes a variable stiffness flexible hoop self-stabilizing module; the variable stiffness flexible hoop self-stabilizing module includes a main fixing frame, a pair of hydraulic mechanical claws, variable stiffness cladding arrays, gap-filling cladding inflatable units, and carbon fiber interlayers; and the main fixing frame is used for being removably connected to the fuselage, the pair of hydraulic mechanical claws are disposed on two sides of the main fixing frame respectively in a manner of moving close to or away from each other, the variable stiffness cladding arrays are disposed on two sides of free ends of inner sides of the pair of hydraulic mechanical claws, the gap-filling cladding inflatable units are disposed in middle positions of the inner sides of the pair of hydraulic mechanical claws, and the gap-filling cladding inflatable units are covered with the carbon fiber interlayers.

Another embodiment of the present invention provides a control method for an underwater submersible robot. The control method is applied to the underwater submersible robot as described in any of the above, and includes:

calculating a first difference between a current actual attitude of a fuselage and a desired attitude and a second difference between an actual depth and a desired depth;

inputting the first difference and the second difference into a set terminal sliding mode surface to obtain an output value of the terminal sliding mode surface;

using the output value as an input of a preset high-order observer, a radial basis function neural network and a terminal sliding mode control law, respectively, and using an output of the high-order observer and an output of the radial basis function neural network as a compensation input of the terminal sliding mode control law to obtain a virtual force outputted by the terminal sliding mode control law;

performing power distribution for each propeller of a propeller assembly on the basis of the virtual force to obtain a propelling force of each propeller; and controlling a propelling operation of the propellers on the basis of the propelling force.

As an improvement on the above solution, the performing power distribution for each propeller of a propeller assembly on the basis of the virtual force to obtain a propelling force of each propeller includes:

filtering the virtual force using a second-order filter, and converting the filtered virtual force into the propelling force of each propeller of the propeller assembly by power distribution.

Another embodiment of the present invention provides a control apparatus for an underwater submersible robot. The control apparatus includes a processor, a memory, and a computer program stored in the memory and configured to be executed by the processor, the processor, when executing the computer program, implementing the control method for an underwater submersible robot described in the above embodiment of the present invention.

Compared with the prior art, one embodiment of the above-described embodiments has the following advantages:

The first difference between the current actual attitude of the fuselage and the desired attitude and the second difference between the actual depth and the desired depth are calculated; the first difference and the second difference are inputted into the set terminal sliding mode surface to obtain the output value of the terminal sliding mode surface; the output value is used as the input of the preset high-order observer, the radial basis function neural network, and the terminal sliding mode control law, respectively, and the output of the high-order observer and the output of the radial basis function neural network are used as the compensation input of the terminal sliding mode control law, so that a data deviation may be compensated for the current underwater turbulence, and the terminal sliding mode control law may ultimately output a more accurate virtual force; power distribution is carried out for each propeller of the propeller assembly on the basis of the virtual force to obtain the propelling force of each propeller; the propellers of the underwater submersible robot are controlled to operate on the basis of the propelling force. Thus, more reasonable motion control may be carried out for the current underwater disturbance. It can be seen that the embodiment of the present invention may improve the anti-disturbance capacity of the underwater submersible robot against underwater turbulence, so as to achieve the autonomous fuselage stabilization under the complex environment and the autonomous extrication operation under the emergency environment, which effectively achieves the autonomous strong anti-disturbance function, improves the operation safety and stability of the equipment, and reduces the occurrence probability of accidents of the equipment. Moreover, based on the control strategy, the intelligent operation of the underwater unmanned aerial vehicle is achieved, the efficiency of underwater engineering detection is substantially improved, the safety of underwater engineering detection work is effectively improved, the need for divers to directly participate in the operation is eliminated, and the risk faced by the staff when operating in the underwater environment is greatly reduced. Of course, it is not necessary for any one of the products that implement the present invention to achieve all of the advantages described above at the same time.

DESCRIPTION OF REFERENCE NUMERALS

Figure 1:
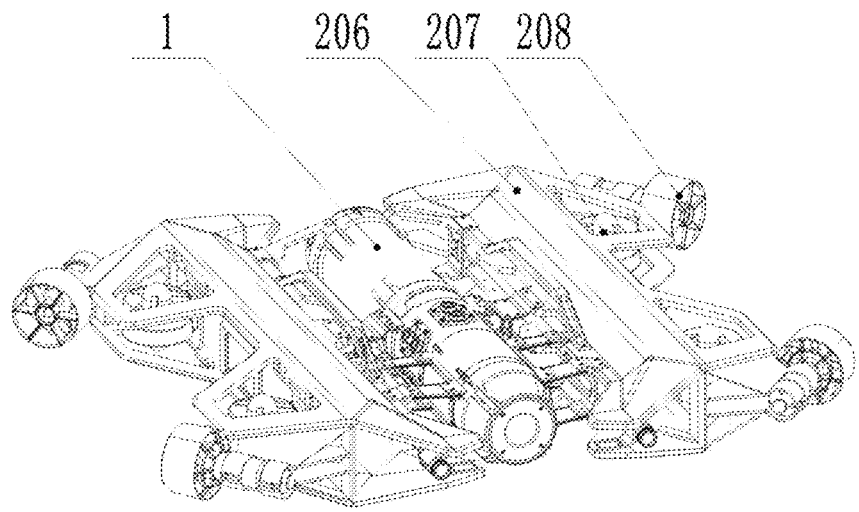
FIG. 1 is a schematic structural diagram of an underwater submersible robot in one view direction according to an embodiment of the present invention.

Fuselage 1; detection apparatus 2; propeller assembly 7; sensing apparatus 8; control apparatus 9;
main body compartment 10; detection head cover 101; coupling portion 102; control compartment shell 103; special-shaped compartment 104; control compartment cover 105; battery compartment cover 106; battery compartment shell 107; compartment cover transition section 108; grip 109;
alloy skeleton 20; head skeleton 201; middle skeleton 202; tail skeleton 203;
streamlined shell 206;
motion assisting module 3; fixing support 301; motor 302; spoiler 303;
adaptive magnetization module 4; lifting plate 401; first small hydraulic rod 402; second small hydraulic rod 403; magnetization fixing module 404; bearing plate 405; second large hydraulic rod 406; first large hydraulic rod 407; adaptive adjustment holding mechanism 408; bottom connecting skeleton 409; mounting bottom plate 410;
underwater vision matrix module 5; linear actuator 501; clamping plate 502; matrix collar 503; waterproof motor 504; waterproof camera 505; motion frame 506; hinged motion frame 507;
variable stiffness flexible hoop self-stabilizing module 6; main fixing frame 601; hydraulic mechanical claw 60; variable stiffness cladding array 607; gap-filling cladding unit 608; and carbon fiber interlayer 609.

DETAILED DESCRIPTION OF EMBODIMENTS

The technical solutions of the embodiments of the present invention will be clearly and completely described below with reference to the accompanying drawings of the embodiments of the present invention. Apparently, the described embodiments are merely a part of the embodiments of the present invention, rather than all the embodiments. All other embodiments derived by a person of ordinary skill in the art from the embodiments of the present invention without any creative effort fall within the scope of protection of the present invention.

In the description of the specification and claims, it should be understood that the terms "upper", "lower", "left", "right", "front", "rear", "top", "bottom", "inner", "outer", and the like indicate orientations or positional relationships based on the orientations or positional relationships shown in the accompanying drawings, and are merely for convenience in describing the embodiments of the present invention, rather than to indicate or imply that the referred apparatus or components must have a particular orientation or be constructed and operated in a particular orientation, and thus they should not be construed as limiting the embodiments of the present invention.

Furthermore, the terms "first", "second", etc. in the specification and claims are merely provided for descriptive purposes of distinguishing between the same technical features, and are not to be construed as indicating or implying relative importance or implicitly indicating the number of technical features indicated, nor necessarily describing the order or chronology. The terms are interchangeable where appropriate. Thus, a feature defined as "first" or "second" may explicitly or implicitly include one or more of these features.

Referring to FIG. 1 to FIG. 24, an embodiment of the present invention provides an underwater submersible robot. The underwater submersible robot includes: a fuselage 1, a detection apparatus 2, a propeller assembly 7, a sensing apparatus 8, and a control apparatus 9. The detection apparatus 2 is disposed on the fuselage 1 and configured to detect an underwater target. The propeller assembly 7 is disposed on the fuselage 1 and configured to drive the underwater submersible robot underwater. The sensing apparatus 8 is disposed on the fuselage 1 and configured to sense an attitude and depth of the fuselage 1. The control apparatus 9 is disposed on the fuselage 1, connected to the detection apparatus, the sensing apparatus and the propeller assembly 7, and configured to execute an active disturbance rejection intelligent control strategy. The active disturbance rejection intelligent control strategy includes the following contents:
    calculating a first difference between a current actual attitude of the fuselage 1 and a desired attitude and a second difference between an actual depth and a desired depth;

inputting the first difference and the second difference into a set terminal sliding mode surface to obtain an output value of the terminal sliding mode surface;

using the output value as an input of a preset high-order observer, a radial basis function neural network and a terminal sliding mode control law, respectively, and using an output of the high-order observer and an output of the radial basis function neural network as a compensation input of the terminal sliding mode control law to obtain a virtual force outputted by the terminal sliding mode control law;

performing power distribution for each propeller of the propeller assembly on the basis of the virtual force to obtain a propelling force of each propeller; and controlling a propelling operation of the propellers on the basis of the propelling force.

As an example, the sensing apparatus 8 includes a depth sensor, an attitude detection sensor, etc., and the sensing apparatus 8 may detect relevant actual attitude data and actual depth data and then transmit same to the control apparatus 9.

Specifically, an attitude deviation and a depth deviation are inputted into the set terminal sliding mode surface, and then the terminal sliding mode surface is used as the input of the preset high-order observer, the radial basis function neural network, and the terminal sliding mode control law, respectively. Since the output of the terminal sliding mode control law is prone to buffeting, the high-order observer is used for more accurately observing the buffeting state and estimating the deviations, which may suppress the buffeting of the output of the terminal sliding mode control law. The radial basis function neural network is an efficient feed-forward neural network capable of achieving nonlinear function approximation and real-time system optimization, and thus the introduction of the radial basis function neural network may improve the stability and anti-disturbance capacity of a sliding mode control system. Therefore, by using the output of the high-order observer and the output of the radial basis function neural network as the compensation input of the terminal sliding mode control law, the virtual force outputted by the terminal sliding mode control law may ultimately be more reasonable, thus ultimately improving the anti-turbulence capacity of the underwater submersible robot.

According to the embodiment of the present invention, the first difference between the current actual attitude of the fuselage and the desired attitude and the second difference between the actual depth and the desired depth are calculated; the first difference and the second difference are inputted into the set terminal sliding mode surface to obtain the output value of the terminal sliding mode surface; the output value is used as the input of the preset high-order observer, the radial basis function neural network, and the terminal sliding mode control law, respectively, and the output of the high-order observer and the output of the radial basis function neural network are used as the compensation input of the terminal sliding mode control law, so that the data deviation may be compensated for the current underwater turbulence, and the terminal sliding mode control law may ultimately output a more accurate virtual force; power distribution is carried out for each propeller of the propeller assembly on the basis of the virtual force to obtain the propelling force of each propeller; the propellers of the underwater submersible robot are controlled to operate on the basis of the propelling force. Thus, more reasonable motion control may be carried out for the current underwater disturbance. It can be seen that the embodiment of the present invention may improve the anti-disturbance capacity of the underwater submersible robot against underwater turbulence, so as to achieve the autonomous fuselage stabilization under the complex environment and the autonomous extrication operation under the emergency environment, which effectively achieves the autonomous strong anti-disturbance function, improves the operation safety and stability of the equipment, and reduces the occurrence probability of accidents of the equipment. Moreover, based on the control strategy, the intelligent operation of the underwater unmanned aerial vehicle is achieved, the efficiency of underwater engineering detection is substantially improved, the safety of underwater engineering detection work is effectively improved, the need for divers to directly participate in the operation is eliminated, and the risk faced by the staff when operating in the underwater environment is greatly reduced.

As an improvement on the above solution, the control apparatus 9, when configured to perform power distribution for each propeller of the propeller assembly on the basis of the virtual force to obtain a propelling force of each propeller, is specifically configured to:

filter the virtual force using a second-order filter, and convert the filtered virtual force into the propelling force of each propeller of the propeller assembly by power distribution.

Specifically, referring to FIG. 23, the specific implementation process of the active disturbance rejection intelligent control strategy is as follows:

Dynamics Modeling:

Firstly, two fundamental coordinate systems of the underwater submersible robot, namely a fixed coordinate system E-$\xi\eta\zeta$ (fixed system) and a moving coordinate system G-xyz (moving system), are established.

The Jacobi matrix has a form of $J(\eta) \in R^{6\times 6}$ and is expressed in the form:

$$J(\eta) = \begin{bmatrix} T_1 & 0_{3\times 3} \\ 0_{3\times 3} & T_2 \end{bmatrix} \quad (1)$$

A linear velocity coordinate transformation matrix $T_1$ between the moving system and the fixed system is:

$$T_1 = \begin{bmatrix} \cos\theta\cos\psi & \sin\varphi\sin\theta\cos\psi - \cos\varphi\sin\psi & \cos\varphi\sin\theta\cos\psi + \sin\varphi\sin\psi \\ \cos\theta\sin\psi & \sin\varphi\sin\theta\sin\psi + \cos\varphi\cos\psi & \cos\varphi\sin\theta\cos\psi - \sin\varphi\sin\psi \\ -\sin\theta & \sin\varphi\cos\theta & \cos\varphi\cos\theta \end{bmatrix} \quad (2)$$

A transformation matrix $T_2$ of an angular velocity from the moving system to the fixed system is:

$$T_2 = \begin{bmatrix} 1 & \sin\varphi\tan\theta & \cos\varphi\tan\theta \\ 0 & \cos\varphi & -\sin\varphi \\ 0 & \sin\varphi\sec\theta & \cos\varphi\sec\theta \end{bmatrix} \quad (3)$$

On the basis of existing modeling experience, the following assumptions are made:

(1) The underwater submersible robot may be regarded as a rigid body with constant mass, ignoring the change of density, pressure and other conditions in water.

(2) When the underwater submersible robot operates, hardware in the fuselage remains fixed, that is, the center of gravity and buoyant center of the underwater submersible robot remain unchanged.

(3) The drag force and moment disturbance brought by a buoyant umbilical cable are neglected.

(4) The underwater submersible robot is in water throughout the operation, and is in a wet state.

(5) The pitch angle θ is limited as $|\theta|\theta_{max} \leq \pi/2$ to prevent the singularity of J(η). $\theta_{max} > 0$ is a known constant. J(η) is invertible and bounded. There exists a known constant J>0 that enables $\sup_n \|J(\eta)\| \leq J$.

Based on the above assumptions, a six-degree-of-freedom nonlinear dynamics equation of the underwater submersible robot is established as follows:

$$M\dot{v}+C(v)v+D(v)v+g(\eta)=\tau+\tau_{d\eta} \quad (4)$$

where $M \in R^{6\times 6}$ denotes an inertia matrix; $C(v) \in R^{6\times 6}$ denotes a Coriolis matrix and a centripetal matrix; $D(v) \in R^{6\times 6}$ denotes a damping matrix; $g(\eta) \in R^6$ denotes a restoring force and moment matrix; $\tau \in R^6$ denotes a propelling force and moment; and $T_{d1} \in R^6$ denotes model uncertainty disturbance.

Double-Loop Control Strategy:

Let $e_1 = x_1 - x_{1_d}$, $e_2 = x_2 - x_{2_d}$ denote a tracking error and a first-order derivative of a second-order system, respectively.

Then, a velocity tracking error sliding mode surface is defined as:

$$S_{\tilde{v}} = v - v_r \quad (5)$$

In combination with (4), $v_c \in R^6$ is designed as a velocity control command for a reference velocity:

$$v_c = J^{-1}(x_1)x_{2_d} - J^{-1}(x_1)\left(K_1 e_1 + K_2 \int_0^t e_1 dt\right) \quad (6)$$

where $K_1 = \text{diag}[k_{11}, k_{12}, \ldots, k_{1n}] \in R^{6\times 6}$ and $K_2 = \text{diag}[k_{21}, k_{22}, \ldots, k_{2n}] \in R^{6\times 6}$ are both pre-designed constant positive definite matrices, and $k_{1i}, k_{2i}(i=1, \ldots, 6)$ satisfies $k_{1i}^2 - 4k_{2i} \geq 0$. In combination with (5) and (6), an outer-loop PID sliding mode surface is designed as:

$$S_{\tilde{v}} = e_2 + K_1 e_1 + K_2 \int_0^t e_1 dt \quad (7)$$

On the basis of (7), an inner-loop terminal sliding mode surface is designed as:

$$S_T = S_{\tilde{v}} + \beta_1 sig^{\gamma_1} S_{\tilde{v}} + \beta_2 sig^{\gamma_2} \frac{dS_{\tilde{v}}}{dt} \quad (8)$$

The differential of v is:

$$\frac{dv}{dt} = M^{-1}(\tau + \tau_{d\eta} - C(v)v - D(v)v - g(x_1)) \quad (9)$$

(7) is differentiated and substituted into (5) to obtain $$\frac{dS\tilde{v}}{dt} = \frac{dv}{dt} - \frac{dv_c}{dt} = M^{-1}(\tau + \tau_{d\eta} - C(v)v - D(v)v - g(x_1)) - \dot{v}_c \quad (10)$$

(10) is substituted into (8) to obtain:

$$S_T = S_{\tilde{v}} + \beta_1 sig^{\gamma_1} S_{\tilde{v}} + \quad (11)$$
$$\beta_2 sig^{\gamma_2}\left[M^{-1}(\tau_{d\eta} - C(v)v - D(v)v - g(x_1)) - \dot{v}_c + M^{-1}\tau\right]$$

A derivative of $S_T$ is taken as:

$$\dot{S}_T = \dot{S}_{\tilde{v}} + \beta_1\gamma_1|S_{\tilde{v}}|^{\gamma_1-1}\dot{S}_{\tilde{v}} + \quad (12)$$
$$\beta_2\gamma_2|\dot{S}_{\tilde{v}}|^{\gamma_2-1}\left[M^{-1}(\dot{\tau}_{d\eta} - \dot{C}(v)v - C(v)\dot{v} - \dot{D}(v)v - D(v)\dot{v} - \dot{g}(x_1)) - \ddot{v}_c + M^{-1}\dot{\tau}\right]$$
$$= -\left\{-\dot{S}_{\tilde{v}} - \beta_1\gamma_1|\beta_1|^{\gamma_1-1}\dot{S}_{\tilde{v}} + \beta_2\gamma_2|\dot{S}_{\tilde{v}}|^{\gamma_2-1}\left[M^{-1}(\dot{C}(v)v + C(v)\dot{v} + \dot{D}(v)v + D(v)\dot{v} + \dot{g}(x_1)) + \ddot{v}_c\right]\right\} + K_d M^{-1}\dot{\tau} + K_d M^{-1}\dot{\tau}_{d\eta}$$
$$f = -\dot{S}_{\tilde{v}} - \beta_1\gamma_1|\beta_1|^{\gamma_1-1}\dot{S}_{\tilde{v}} + $$
$$\beta_2\gamma_2|\dot{S}_{\tilde{v}}|^{\gamma_2-1}\left[M^{-1}(\dot{C}(v)\dot{v} + C(v)\dot{v} + \dot{D}(v)v + D(v)\dot{v} + \dot{g}(x_1)) + \ddot{v}_c\right] - K_d M^{-1}\dot{\tau}_{d\eta}$$

serves as a lumped unknown function, and $G = K_d M^{-1}$.

The above equation may then be simplified to:

$$\dot{S}_T = -f + G\dot{\tau} \quad (13)$$

The Gaussian radial basis function (RBF) neural network has the function approximation ability and may be applied to control over complex nonlinear systems with uncertainty. The present invention designs six identical Gaussian radial basis function (RBF) neural networks. The ideal value of the unknown function $f$ to be approximated may be described as:

$$f = W^{*T}\phi(S_T) - \varepsilon \quad (14)$$

where $\phi(S_T) \in R^{30}$, $s = [S_{T_1}, S_{T_2}, \ldots, S_{T_n}]$ denotes a neural network input vector, $W^* = [W^*_1, W^*_2, \ldots, W^*_n]^T$ denotes an ideal weight vector, $W^*_i = [W^*_{i1}, W^*_{i2}, \ldots, W^*_{i5}]^T$ (i=1 ... 6, 5 denotes the number of hidden nodes), $\phi(s) = \text{diag}[\phi_1(S_{T_1}), \phi_2(S_{T_2}), \ldots, \phi_6(S_{T_6})]$ has a basis function of $\phi_i(S_{T_i}) = [\phi_{i1}(S_{T_i}), \phi_{i2}(S_{T_i}), \ldots, \phi_{i5}(S_{T_i})]^T$, and $\varepsilon = [\varepsilon_1, \varepsilon_2, \ldots, \varepsilon_6]^T$ is a bounded approximation vector. Therefore, $\varepsilon \leq \bar{\varepsilon}$ and $\bar{\varepsilon} > 0$ may be obtained. The Gaussian radial basis function (RBF) considered in the present invention is given.

$$\phi_{ik}(s_i) = \exp\left[\frac{(s_i - c_{ik})^T(s_i - c_{ik})}{b_{ik}^2}\right]$$

$$i=1,2,\ldots,6, k=1,2,\ldots,5 \quad (15)$$

$C_{ik}$ and $b_{ik}$ denote the center and width of the Gaussian function, respectively.

The vector for estimating the weight is expressed as $$\hat{W} = W^* + \tilde{W} \quad (16)$$

where W denotes an error vector for estimating the weight.

The unknown function $f \in R^6$ is set as an output of the RBF, so it may be expressed as $$\hat{f} = \hat{W}^T \phi(S_T) \quad (17)$$

The proposed design of a double-loop neural network sliding mode controller is as follows:

$$\tau = \frac{1}{G}(\hat{f} - KS_T) \quad (18)$$

where $K=\text{diag}[K_1, K_2, \ldots, K_n]$ is a constant diagonal matrix, and (18) is substituted into (13) to obtain $$\dot{S}_T = \tilde{f} - KS_T \quad (19)$$

where $\tilde{f} = \hat{f} - f$.

A Lyapunov function is selected:

$$V = V_1 + V_2 + V_3 \quad (20)$$

where $$V_1 = \frac{1}{2}\sum_{i=1}^{n}\left(\tilde{W}_i^T I_i^{-1} \tilde{W}_i\right) \quad (21)$$

$$V_2 = \frac{1}{2}S_T^T S_T \quad (22)$$

$$V_3 = \frac{1}{2}\sum_{i=1}^{n}\Theta_i^T \Theta_i \quad (23)$$

Proof: (20) is differentiated $$\dot{V}_1 = \sum_{i=1}^{n}\tilde{W}_i^T I_i^{-1} \dot{\tilde{W}}_i \quad (24)$$

Since $W^*$ is a constant and $\dot{\tilde{W}} = \dot{\hat{W}}$, the following may be obtained on the basis of (24):

$$\dot{V}_1 = \sum_{i=1}^{n}\tilde{W}_i^T I_i^{-1} \dot{\hat{W}}_i \quad (25)$$

Now, an update law may be substituted as:

$$\dot{\hat{W}}_i = I_i(s_i\phi_i(s_i) + \alpha_i \hat{W}_i), i=1,2,\ldots,n \quad (26)$$

where $\alpha_i$ is a small constant used for denoting a correction term, which helps to improve the robustness of a controlled system.

By substituting the update law (26) into (25), the following may be obtained:

$$\dot{V}_1 = -\sum_{i=1}^{n} s_i \tilde{W}_i^T \phi_i(s_i) - \sum_{i=1}^{n}\alpha_i \tilde{W}_i^T \hat{W}_i \quad (27)$$

where $$-\tilde{W}_i^T \hat{W}_i = -\tilde{W}_i^T W^*_i - \tilde{W}_i^T \tilde{W}_i \quad (28)$$

In combination with lemma 2, the following may be obtained on the basis of (28):

$$-\frac{1}{2}\left(\tilde{W}_i^T \tilde{W}_i + W_i^{*T} W_i^*\right) \le -\tilde{W}_i^T W_i^* \le \frac{1}{2}\left(\tilde{W}_i^T \tilde{W}_i + W_i^{*T} W_i^*\right) \quad (29)$$

In combination with (28) and (29), the following may be obtained:

$$-\tilde{W}_i^T \hat{W}_i \le \frac{1}{2}\tilde{W}_i^T \tilde{W}_i + \frac{1}{2}W_i^{*T}W_i^* - \tilde{W}_i^T \tilde{W}_i \le -\frac{1}{2}\tilde{W}_i^T \tilde{W}_i + \frac{1}{2}W_i^{*T}W_i^* \quad (30)$$

On the basis of (30), the following may be obtained:

$$\dot{V}_1 \le -\sum_{i=1}^{n} s_i \tilde{W}_i^T \phi_i(s_i) - \sum_{i=1}^{n}\frac{\alpha_1}{2}\tilde{W}_i^T \tilde{W}_i + \sum_{i=1}^{n}\frac{\alpha_1}{2}W_i^{*T}W_i^* \quad (31)$$

(22) is differentiated:

$$\dot{V}_2 = S_T^T \dot{S}_T = S_T^T(\tilde{f} - KS_T) \quad (32)$$

(13) and (17) are substituted into (32) to obtain:

$$\dot{V}_2 = S_{T_i}\left(\hat{W}_i^T \phi_i(S_T) - W_i^{*T}\phi_i(S_T)\right) + S_T^T(\varepsilon - KS_T) = \sum_{i=1}^{6} S_{T_i}\tilde{W}^T \phi_i(S_T) + s^T \varepsilon - S_T^T KS_T \quad (33)$$

where $\tilde{W}^T = \hat{W}_i^T - W^*_i{}^T$.

On the basis of (33), the terminal sliding mode surface error may be obtained as follows:

$$S_T^T \varepsilon \le \frac{1}{2}S_T^T S_T + \frac{1}{2}\varepsilon^T \varepsilon \quad (34)$$

Because of (33), (34) may become an inequality as:

$$\dot{V}_2 \le \sum_{i=1}^{6} S_{T_i}\tilde{W}^T \phi_i(S_T) + \frac{1}{2}S_T^T S_T + \frac{1}{2}\varepsilon^T \varepsilon - S_T^T KS_T \quad (35)$$

The differential term of the terminal sliding mode surface corresponds to the dynamics equation (4) of the underwater submersible robot, (4) is subdivided into a standard term and an uncertainty term, and because the underwater submersible robot has high nonlinearity, high coupling and strong disturbance, the dynamics equation of the standard term is inaccurate, but the terminal sliding mode surface needs high model accuracy. Thus, it is necessary to design a high-order observer to compensate for the uncertainty term. Because of (8), the following may be obtained:

$$\dot{v} = \check{\tau} + \check{\tau}_{d\eta} - \check{C}(v)c - \check{D}(v)v - \check{g}(x_1) \quad (36)$$

where $$\check{\tau} = M^{-1}\tau, \check{C}(v) = M^{-1}C(v), \check{D}(v) = M^{-1}D(v), \check{g}(x_1) = M^{-1}g(\eta), \check{\tau}_{d\eta} = M^{-1}\tau_{d\eta}$$

Because $\check{\tau}_{i_{d\eta}}$ of $S_i$ in (36) is an unknown term, high-order observers $\pi_i$ are designed. The adopted high-order observers are as follows:

$$\dot{\pi}_{i0}=\pi_{i1}-\check{C}_i(v_i)v_i-\check{D}_i(v_i)v_i-\check{g}_i(\eta_i)+\vartheta_{i0}(v_i-\pi_{i0})$$

$$\dot{\pi}_{i1}=\pi_{i2}+\vartheta_{i1}(v_i-\pi_{i109})$$

$$\dot{\pi}_{i2}=\pi_{i3}+\vartheta_{i2}(v_i-\pi_{i\frown})$$

.

.

.

$$\dot{\pi}_{im}=\vartheta_{im}(v_i-\pi_{i0}) \tag{37}$$

where $\pi_{i0}, \pi_{i1}, \pi_{i2}, \ldots, \pi_{im}$ are estimated values of $v_i, \check{\tau}_{i_{d\eta}}, \check{\tau}_{i_{d\eta}}', \ldots, \tau^{(m)}_{i_{d\eta}}$, respectively, and $\vartheta_{i0}, \ldots, \vartheta_{im} > 0$. $\Theta_{i0}(\tau)=v_i-\pi_{i0}$, $\Theta_{i1}(\tau)=\check{\tau}_{i_{d\eta}}-\pi_{i1}, \ldots, \Theta_{im}(\tau)=\check{\tau}_{id\eta}^{(m)}-\pi_{im}$ is given, and in combination with (37), the following may be obtained:

$$\dot{\tilde{\Theta}}_{i0}=\tilde{\Theta}_{i1}-\vartheta_{i0}\tilde{\Theta}_{i0}$$

$$\dot{\tilde{\Theta}}_{i0}=\tilde{\Theta}_{i2}-\vartheta_{i1}\tilde{\Theta}_{i0}$$

$$\dot{\tilde{\Theta}}_{i2}=\tilde{\Theta}_{i3}-\vartheta_{i2}\tilde{\Theta}_{i0}$$

$$\dot{\tilde{\Theta}}_{im}=\check{\tau}_{id\eta}^{(m)}-\vartheta_{im}\tilde{\Theta}_{i0} \tag{38}$$

In combination with (37) and (38), the following may be deduced:

$$\dot{\tilde{\Theta}}_i=\varphi_i\tilde{\Theta}_i+\Gamma_i\check{\tau}_{id\eta}^{(m)} \tag{39}$$

where $$\varphi_i = \begin{bmatrix} -\vartheta_{i0} & 1 & 0 & \cdots & 0 \\ -\vartheta_{i1} & 1 & 1 & \cdots & 0 \\ \vdots & \vdots & \vdots & \ddots & \vdots \\ -\vartheta_{im-1} & 0 & 0 & \cdots & 1 \\ -\vartheta_{im} & 0 & 0 & \cdots & 0 \end{bmatrix}, \Gamma_i = \begin{bmatrix} 0 \\ \vdots \\ \vdots \\ \vdots \\ 1 \end{bmatrix} \tag{40}$$

Then, the positive definite function (23) is selected to obtain:

$$V_{3i} = \frac{1}{2}\tilde{\Theta}_i^T\tilde{\Theta}_i \tag{41}$$

$V_{3i}$ is differentiated, and (39) is called to obtain:

$$\dot{V}_{3i}=\tilde{\Theta}_i^T\dot{\tilde{\Theta}}_i=\tilde{\Theta}_i^T(\varphi_i\tilde{\Theta}_i+\Gamma_i\check{\tau}_{id\eta}^{(m)}) \tag{42}$$

The result of lemma 2 is applied to (42) to obtain:

$$\dot{V}_{3i} \leq \tilde{\Theta}_i^T(\varphi_i+\xi_iI)\tilde{\Theta}_i+\frac{1}{Y_i}\xi_i^2 \tag{43}$$

where $Y_i > 0$, $i=1, 2, \ldots, 6$, and $I$ is the quadratic of $\check{\tau}_{id\eta}^{(m)}$. Now $V_3$ is differentiated to obtain:

$$\dot{V}_3 = \sum_{i=1}^{6}\tilde{\Theta}_i^T\dot{\tilde{\Theta}}_i \tag{44}$$

(43) is substituted into 44) to obtain:

$$\dot{V}_3 \leq \sum_{i=1}^{6}\tilde{\Theta}_i^T(\varphi_i+Y_iI)\tilde{\Theta}_i+\frac{1}{Y_i}\xi_i^2 \tag{45}$$

(20) is differentiated, and (31), (35) and (45) are called to obtain:

$$\dot{V} = \dot{V}_1 + \dot{V}_2 + \dot{V}_3 \leq -\sum_{i=1}^{6}S_{T_i}\tilde{W}_i^T\phi_i(S_{T_i}) - \tag{46}$$

$$\sum_{i=1}^{6}\frac{\alpha_i}{2}\tilde{W}_i^T\tilde{W}_i + \sum_{i=1}^{6}\frac{\alpha_i}{2}W_i^{*T}W_i^* + \sum_{i=1}^{6}S_i\tilde{W}^T\phi_i(S_T) +$$

$$\frac{1}{2}S_T^TS_T + \frac{1}{2}\varepsilon^T\varepsilon - S_T^TKS_T + \sum_{i=1}^{6}\tilde{\Theta}_i^T(\varphi_i+Y_iI)\tilde{\Theta}_i + \frac{1}{Y_i}\xi_i^2 \leq$$

$$-S_T^T\left(K-\frac{1}{2}I\right)S_T - \sum_{i=1}^{6}\frac{\alpha_i}{2}\tilde{W}_i^T\tilde{W}_i - \sum_{i=1}^{6}\tilde{\Theta}_i^T(-\varphi_i-Y_iI)\tilde{\Theta}_i +$$

$$\sum_{i=1}^{6}+\frac{1}{Y_i}\xi_i^2+\sum_{i=1}^{6}\frac{\alpha_i}{2}W_i^{*T}W_i^*+\frac{1}{2}\varepsilon^T\varepsilon$$

Then, lemma 1 is cited to obtain:

$$\dot{V} \leq -\rho(\dot{V}_1+\dot{V}_2+\dot{V}_3)+\mu \tag{47}$$

where $$\rho = \min\left(\min_{i=1,2,\ldots,6}(\alpha_i), 2\lambda_{min}\left(K-\frac{1}{2}I\right), -2\lambda_{min}(\varphi_i+Y_iI)\right) \tag{48}$$

$$\mu = \sum_{i=1}^{6}+\frac{1}{\delta_i}\xi_i^2+\sum_{i=1}^{6}\frac{\alpha_i}{2}W_i^{*T}W_i^*+\frac{1}{2}\varepsilon^T\varepsilon \tag{49}$$

$\lambda_{min}(\cdot)$ denotes the minimum eigenvalue of the matrix. By making $$\lambda_{min}\left(K-\frac{1}{2}I\right) > 0$$

and $\lambda_{min}((\varphi_i+Y_iI)<0$, $\rho>0$ is ensured, apparently, $\mu$ being a normal number.

Proof is completed.

Theorem 1: For the described underwater submersible robot system, under the control law (18) and the update law (26), the sliding mode surface error and a derivative thereof are semi-globally uniformly bounded as long as initial conditions are bounded.

Proof: (47) is multiplied by $e^{\beta t}$ to obtain:

$$\frac{d}{dt}(Ve^{\rho t}) \leq \mu e^{\rho t} \tag{50}$$

(50) is differentiated to obtain:

$$V \leq \frac{\mu}{\rho}+e^{-\rho t}\left(V(0)-\frac{\mu}{\rho}\right) \leq \frac{\mu}{\rho}+V(0)e^{-\rho t} \tag{51}$$

(21), (22) and (23) are substituted into (51) respectively to obtain:

$$V_1 = \frac{1}{2}\sum_{i=1}^{6}\left(\tilde{W}_i^T I_i^{-1} \tilde{W}_i\right) \le V \le \frac{\mu}{\rho} + V(0)e^{-\rho t} \quad (52)$$

$$V_2 = \frac{1}{2}S_T^T S_T \le V \le \frac{\mu}{\rho} + V(0)e^{-\rho t} \quad (53)$$

$$V_3 = \frac{1}{2}\sum_{i=1}^{6}\tilde{\Theta}_i^T \tilde{\Theta}_i \le V \le \frac{\mu}{\rho} + V(0)e^{-\rho t} \quad (54)$$

$$\Omega \tilde{W}_i := \left\{ \tilde{W}_i \in R^6 \middle| \|\tilde{W}_i\| \le \sqrt{2}\sqrt{\frac{\left(\frac{\mu}{\rho} + V(0)e^{-\rho t}\right)}{\min_{i=1,2,\ldots,6}\left(I_i^{-1}\right)}} \right\}, \quad (55)$$

$$i = 1, \ldots, 6 \forall t \in [0, +\infty)$$

$$\Omega S_T := \left\{ S_T \in R^6 \middle| \|S_T\| \le \sqrt{2}\sqrt{\frac{\mu}{\rho} + V(0)e^{-\rho t}} \right\} \forall t \in [0, +\infty) \quad (56)$$

$$\Omega \tilde{\Theta}_i := \left\{ \tilde{\Theta}_i \in R^6 \middle| \|\tilde{\Theta}_i\| \le \sqrt{2}\sqrt{\frac{\mu}{\rho} + V(0)e^{-\rho t}} \right\}, \quad (57)$$

$$i = 1, \ldots, 6 \forall t \in [0, +\infty)$$

Proof is completed.

On the basis of lemma 1, the inner-loop terminal sliding mode surface may be $S_T = 0$ within the finite time $t_{reach}$, so the following may be obtained:

$$S_{\tilde{v}} + \beta_1 sig^{\gamma_1} S_{\tilde{v}} + \beta_2 sig^{\gamma_2} \frac{dS_{\tilde{v}}}{dt} = 0 \quad (58)$$

$$S_{\tilde{v}} + \beta_1 sig^{\gamma_1} S_{\tilde{v}} + \beta_2 sig^{\gamma_2} \frac{dS_{\tilde{v}}}{dt} = 0, i = 1, \ldots, 6$$

The following two forms may be obtained using (58):

$$S_{\tilde{v}} + \beta_1 sig^{\gamma_1} S_{\tilde{v}} + \left(\beta_2 - S_T \cdot sig^{-\gamma_2}\frac{dS_{\tilde{v}}}{dt}\right) sig^{\gamma_2}\frac{dS_{\tilde{v}}}{dt} = 0 \quad (59)$$

$$e_1 + \beta_2 sig^{\gamma_2} e_2 + (\beta_1 - S_T \cdot sig^{-\gamma_1} S_{\tilde{v}}) sig^{\gamma_1} S_{\tilde{v}} = 0 \quad (60)$$

When $$\beta_2 - S_T \cdot \left(sig^{-\gamma_2}\frac{dS_{\tilde{v}}}{dt}\right) > 0$$

holds, (60) still remains in $s = e_1 + \beta_1 sig^{\gamma_1} e_1 + \beta_2 sig^{\gamma_2} e_2$. Therefore, the system trajectory may continue to converge to the sliding mode surface s until reaching $$sig^{\gamma_2}\frac{dS_{\tilde{v}}}{dt} < \frac{1}{\beta_2}S_T = \frac{1}{\beta_2}\Xi,$$

so a control error $$\frac{dS_{\tilde{v}}}{dt}$$

may converge to the following region within the finite time:

$$\left|\frac{dS_{\tilde{v}}}{dt}\right| \le \left|\frac{1}{\beta_2}S_T\right|^{\frac{1}{\gamma_2}} < \left|\frac{1}{\beta_2}\phi\right|^{\frac{1}{\gamma_2}} \quad (61)$$

(59) may be proved using the same proof steps, thus obtaining $$sig^{\gamma_1} S_{\tilde{v}} < \frac{1}{\beta_1}S_T = \frac{1}{\beta_1}\Xi,$$

where $\Xi$ denotes the Greek character "xi", and $\Xi$ is as a constant, representing the upper bound in the equation. Then, by combining (61) and $$sig^{\gamma_2}\frac{dS_{\tilde{v}}}{dt} < \frac{1}{\beta_2}S_T = \frac{1}{\beta_2}\Xi,$$

the following may be obtained:

$$S_{\tilde{v}} \le |S_T| + |\beta_1 sig^{\gamma_1} S_T| + \left|\beta_2 sig^{\gamma_2}\frac{dS_{\tilde{v}}}{dt}\right| = 3\Xi \quad (62)$$

$$\frac{dS_{\tilde{v}}}{dt} \le \left|\frac{dS_{\tilde{v}}}{dt}\right| \le \left|\frac{1}{\beta_2}\phi\right|^{\frac{1}{\gamma_2}} \quad (63)$$

Therefore, on the basis of the above analysis, the velocity tracking error converges to zero within the finite time, and the initial value of the total time spent is $\tilde{v}(0)$ to zero.

$$t_{sum} = t_{reach} + {}_{i=1,2,\ldots,6}^{max}(t_c) \quad (64)$$

After $t > t_{sum}$, the following may be obtained from (7):

$$V = V_c \quad (65)$$

$S_{\tilde{v}} = 0$ may be obtained from (65), and the following may be obtained from (6):

$$e_2 + K_1 e_1 + K_2 \int_0^t e_1 dt = 0$$

$$e_{2i} + K_{1i} e_{1i} + K_{2i}\int_0^t e_{1i} dt = 0 \cdot i = 1, \ldots, 6 \quad (66)$$

As long as (66) satisfies $K_{1i}^2 - 4K_{2i} \ge 0$, $i = 1, \ldots, 6$, $\int_0^t \eta_i dt (i=1, \ldots, 6)$ may converge to zero within the finite time, and thus, like the velocity tracking error of (58), the position tracking error $e_1$ may converge exponentially to zero after $t_{sum}$.

It can be understood that by considering (66) as a zero-input second-order filter system, the intrinsic frequency and damping ratio thereof may be expressed as $$\omega_n = \sqrt{\frac{K_2}{1}}$$

and $$\zeta = \frac{K_1}{2\sqrt{K_2 * 1}},$$

respectively. The time-domain method is adopted for analysis, firstly, $K_{1i}^2 - 4K_{2i} \ge 0$, $=1, \ldots, 6$ has been assumed, the filter system is capable of exponentially converging, and the closer the damping ratio ζ is to 0.707, the faster the second-order filter system converges, and the smaller the amount of overshooting is, which is the best state for the comprehensive performance of the second-order filter system.

In summary, by means of the active disturbance rejection intelligent control strategy, the robot autonomously compensates for the water current turbulence during trajectory tracking, so as to achieve accurate path tracking and navigation control.

Figure 2:
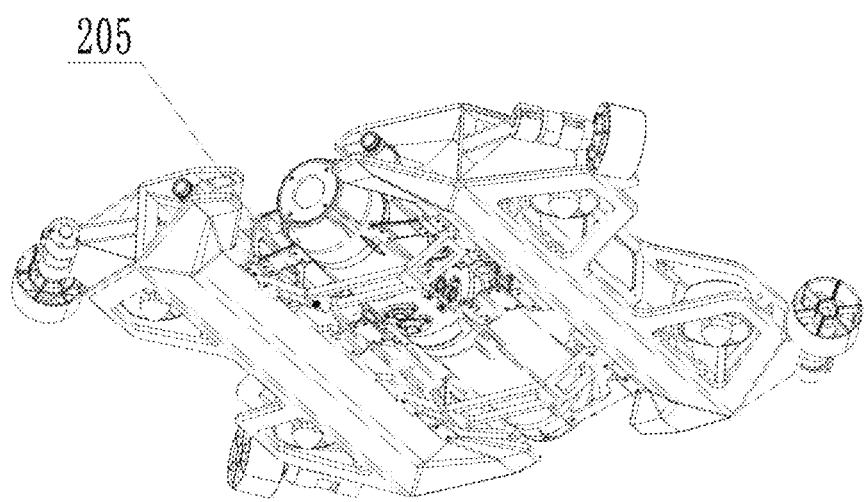
FIG. 2 is a schematic structural diagram of an underwater submersible robot in another view direction according to an embodiment of the present invention.

As an improvement to the above solution, referring to FIG. 1 and FIG. 2, the propeller assembly 7 includes four propellers, the four propellers are disposed at two ends of two sides of the fuselage 1 respectively in a manner of rotating up and down and left and right, and the four propellers are connected to the control apparatus 9.

As an improvement to the above solution, referring to FIG. 1 to FIG. 4, the fuselage 1 includes a main body compartment 10, two alloy skeletons 200 and two streamlined shells 206. The two alloy skeletons 200 are disposed on the main body compartment 10 in a manner of rotating around an axial direction of the main body compartment 10. The two streamlined shells 206 enclose the two alloy skeletons 200 in a one-to-one correspondence manner and are correspondingly connected to the two alloy skeletons 200.

Specifically, the main body compartment 10 includes, in a lengthwise direction, a detection head cover 101, a coupling portion 102, a control compartment shell 103, a special-shaped compartment 104, a control compartment cover 105, a battery compartment cover 106, a battery compartment shell 107, a compartment cover transition section 108, and a grip 109 connected in sequence. The interior of the control compartment shell 103 is used for accommodating the control apparatus 9, the interior of the detection head cover 101 is used for accommodating a camera, and the interior of the battery compartment cover 106 is used for accommodating a battery compartment. A portion of the coupling portion 102 in contact with the control compartment shell 103 and a portion of the coupling portion in contact with the detection head cover 101 are provided with annular grooves along an outer periphery of the coupling portion, O-shaped seal rings are mounted in the annular grooves, the portions of the coupling portion 102 extend into the detection head cover 101 and the special-shaped compartment 104 and fit tightly, and the portions of the coupling portion 102 extending into the detection head cover 101 and the special-shaped compartment 104 are provided with jackscrews. A portion of the special-shaped compartment 104 in contact with the control compartment shell 103 is provided with an annular groove with an O-shaped seal ring, and an outer periphery of the special-shaped compartment 104 is concave to form eight tables for mounting of watertight joints. The sensing apparatus including the depth sensor, a switch, etc. is disposed in the special-shaped compartment and leads out wires by means of the watertight joints. A middle position of the control compartment cover 105 is concave to form an accommodation slot for accommodating a male socket plug connected to the battery compartment cover 106. A middle position of the battery compartment cover 106 is concave to form an accommodation slot for accommodating a female socket plug in plugged connection with the male socket plug. An O-shaped seal ring is disposed between connecting portions of the battery compartment cover 106 and the battery compartment shell 107. A battery platform is provided inside the battery compartment cover 106 for placement of a battery. An O-shaped seal ring and a jackscrew are provided at a connecting position of one end of the compartment cover transition section 108 and the battery compartment shell 107. The grip 109 is provided at the other end of the compartment cover transition section 108.

Figure 3:
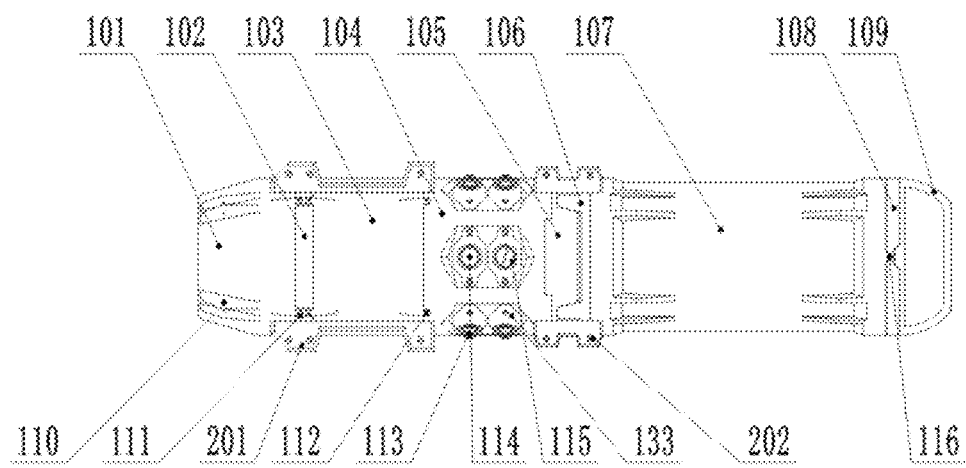
FIG. 3 is a schematic structural diagram of a fuselage of an underwater submersible robot according to an embodiment of the present invention.
Figure 4:
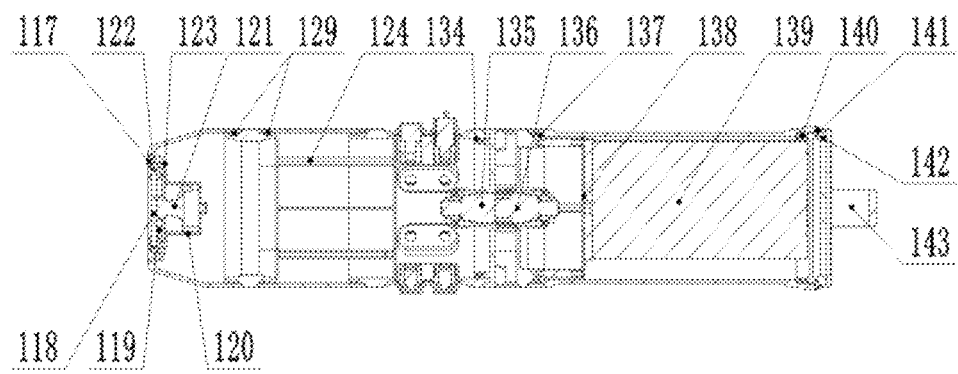
FIG. 4 is a cross-sectional view of a fuselage of an underwater submersible robot according to an embodiment of the present invention.
Figure 5:
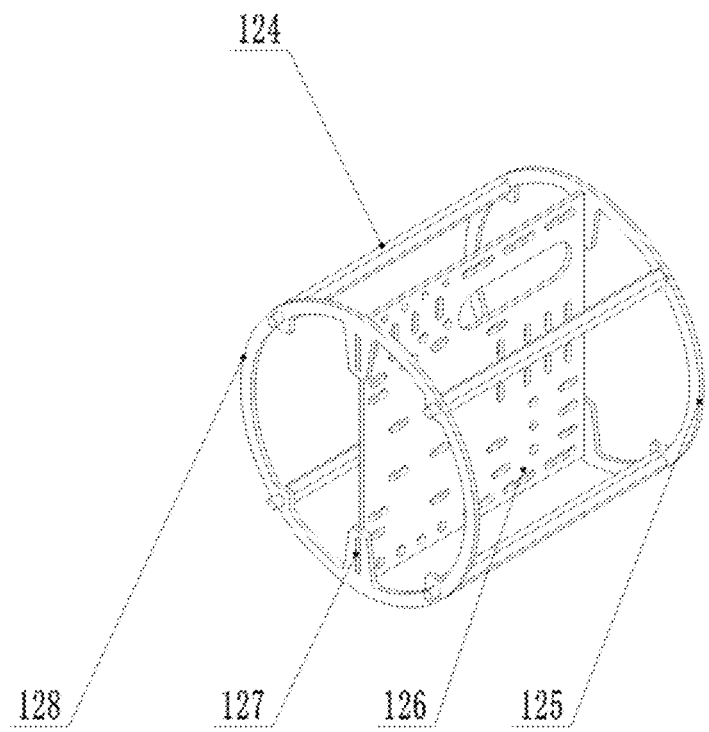
FIG. 5 is a schematic diagram of an electronic component fixed to a skeleton of a fuselage according to an embodiment of the present invention.
Figure 6:
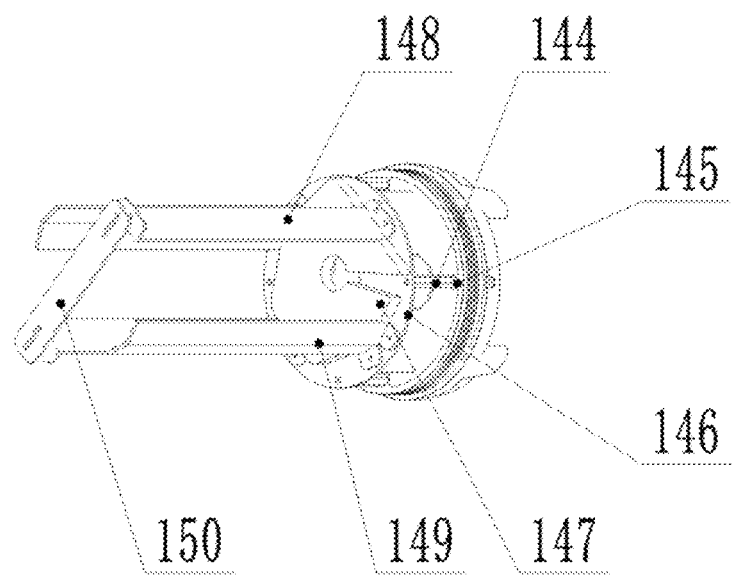
FIG. 6 is a schematic structural diagram of an adjustable battery fixing skeleton of a fuselage according to an embodiment of the present invention.
Figure 7:
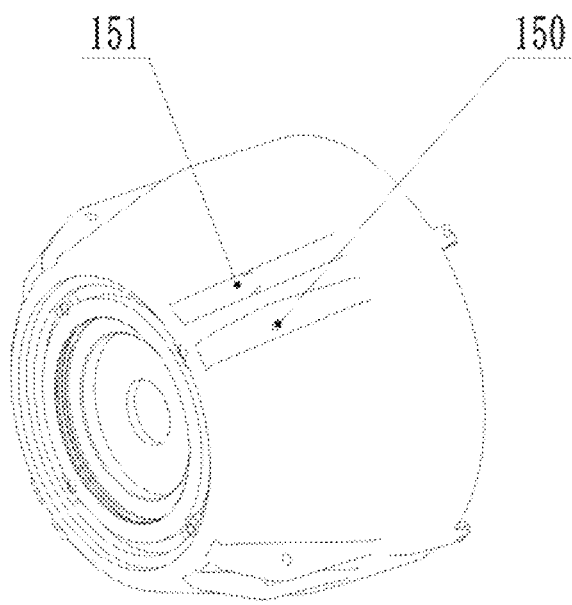
FIG. 7 is a schematic structural diagram of a low-flow resistance detection head cover of a fuselage according to an embodiment of the present invention.
Figure 8:
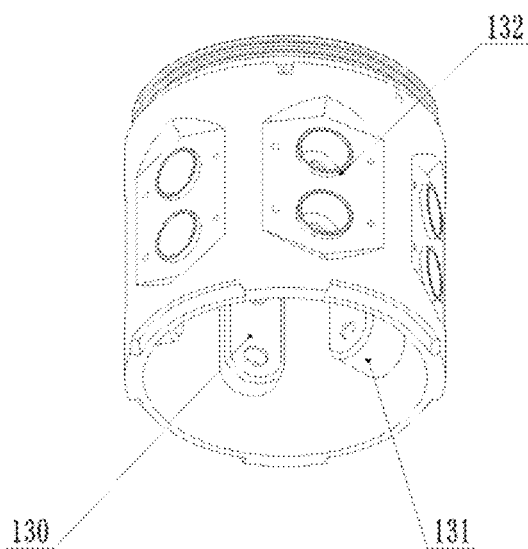
FIG. 8 is a schematic structural diagram of a special-shaped compartment of a fuselage according to an embodiment of the present invention.

As an improvement to the above solution, referring to FIG. 3 and FIG. 4, the alloy skeletons 200 include head skeletons 201, middle skeletons 202, and tail skeletons 203 disposed in sequence along the lengthwise direction of the main body compartment 10. The head skeletons 201, the middle skeletons 202 and the tail skeletons 203 are connected to two ends of two sides of the main body compartment 10 respectively by means of the coupling portion 102. The main body compartment 10 is connected to the corresponding streamlined shells 206 by means of the head skeletons 201, the middle skeletons 202 and the tail skeletons 203. An expansion skeleton is disposed at a bottom of the main body compartment 10, and holes are reserved in the expansion skeleton for mounting of an expansion module.

The fuselage of the underwater submersible robot is more specifically described below for ease of understanding:

Referring to FIG. 1 to FIG. 8, the fuselage of the underwater submersible robot includes three modules, namely, the main body compartment 1, the high-strength lightweight alloy skeletons 200, and the streamlined shells 206, to form the main body of an unmanned aerial vehicle. The main body compartment 1 module includes nine portions, namely the detection head cover 101, the coupling portion 102, the control compartment shell 103, the special-shaped compartment 104, the control compartment cover 105, the battery compartment cover 106, the battery compartment shell 107, the compartment cover transition section 108, and the grip 109. A lens cover plate 117, an O-shaped ring 122, a camera mounting plate 120, an EVA foam 119, a tempered glass 118, and an ultra definition camera 121 are disposed inside the detection head cover 101. The ultra definition camera 121 is mounted on the camera mounting plate 120, and the camera mounting plate 120 is fixed to the detection head cover 101 by screws 123 for image recognition.

An electronic component placement plate is disposed inside the control compartment shell 103. The electronic component placement plate is fixed to an inner wall of the coupling portion 102 by means of copper posts 124. Various types of control components and electronic components may be mounted and placed on the electronic component placement plate. The electronic component placement plate is divided into a left baffle plate 128, a right baffle plate 125, and a middle supporting plate 126. The left and right baffle plates are connected and fixed to the coupling portion 102 by means of the copper posts 124. The middle supporting plate 126 is clamped by the left and right baffle plates. Two sides of the middle supporting plate 126 may be embedded in slots 127 in the left and right baffle plates to achieve fixation. The left and right baffle plates are designed to be hollow in the middle to facilitate the passage of wires, and only the positions in embedded fit with the middle supporting plate 126 are provided with the slots 127. Various types of slots and openings are provided inside the middle supporting plate 126 for mounting of electronic components.

Slots 129 are provided in the portions of the coupling portion 102 in contact with the control compartment shell 103 and the detection head cover 101 for accommodating O-shaped rings. In the case of connection, part of walls of the coupling portion 102 extend into the detection head cover 101 and the special-shaped compartment 104 and fit tightly to achieve watertight mounting, and jackscrews 111 are provided in the fitted extending positions to achieve fixation of the two compartments without disengagement, and subsequent mounting of the compartments is also carried out in this way.

The special-shaped compartment 104 is connected to the control compartment shell 103, and the contact portion is also grooved to accommodate an O-shaped ring. The special-shaped compartment 104 is provided with eight small tables, and the small tables 132 are designed in a concave manner for mounting of the watertight joints 113, the depth sensor 1140, and the switch 115. Wires are led out through the watertight joints 113 to achieve waterproofing and quick disassembly and assembly. The watertight joints 113 are mounted on watertight seats 133, and further, the watertight seats 133 are mounted on six small tables 132 on the special-shaped compartment 104. One table 131 is left for mounting the watertight joint 113 and the switch 114, and the table 131 is deeper than the table 130. Similarly, the watertight joint 113 and the switch 114 are also mounted on the special-shaped compartment 104 by means of the watertight seat 133.

The special-shaped compartment 104 is also in watertight connection with the control compartment cover 105 in the same way, with a watertight O-shaped ring 134 provided at the connecting portion. The control compartment cover 105 is concave in the middle for accommodating the male socket plug 135 to be connected to the battery compartment cover 106. The battery compartment cover 106 is also provided with the same structure in the middle for accommodating the female socket plug 136. A protruding portion in the middle of the battery compartment cover 106 may be embedded into the control compartment cover 105 during installation, and the depressions in the middle of the control compartment cover 105 and the battery compartment cover 106 are used for accommodating the male socket plug 135 and the female socket plug 136, respectively. The battery compartment cover 106 is connected to the battery compartment shell 107, also with an O-shaped ring 137 provided at the connecting portion. The battery platform 138 is provided inside the battery compartment, and the battery platform 138 is used for placement of the battery 139. The battery platform 138 is connected to apertures 145 in the battery compartment cover 106 by means of copper posts 144. The battery platform 138 includes a battery rack 146, a wire EVA plate 147, a battery flat plate supporting bracket 148, a battery bending supporting bracket 149, and a battery top plate 150. The battery rack 146 is connected to the battery compartment cover 106 by means of the copper posts 144. A hole in the middle of the battery rack 146 is used for the passage of a battery wire. The wire EVA plate 147 is placed on the battery rack 146 and used for leading out the battery wire. The battery bending supporting bracket 149 and the battery flat plate supporting bracket 148 are placed on the battery rack 146 and fixed by screws, and are used for limiting the movement of a battery in the radial direction. The battery top plate 150 is connected to tops of the battery bending supporting bracket 149 and the battery flat plate supporting bracket 148 to prevent the battery from moving in the axial direction.

The compartment cover transition section 108 is connected to the battery compartment shell 107, with an O-shaped ring 140 and a jackscrew 141 provided at the connecting portion. The compartment cover transition section 108 is connected to a grip 143.

The main body compartment 1 is connected to the shells by means of the head skeletons 201, the middle skeletons 202 and the tail skeletons 203. The head skeletons 201, the middle skeletons 202, and the tail skeletons 203 are symmetrically disposed on the left and right sides of the main body compartment 1 respectively, and are fixed to the coupling portion 102 on the main body compartment by screws. The head skeletons 201, the middle skeletons 202, and the tail skeletons 203 are connected to the streamlined shells 206. The head skeletons 201 are coupled to a main control compartment and the streamlined shells 206. The tail skeletons 203 are coupled to a power supply compartment and the low-flow resistance shell 206. The shells are longitudinally provided with four brushless motor propellers 207 to provide lifting and lowering power, and transversely provided with four catheter propellers 208 in a vectorial manner, and wires thereof enter the special-shaped compartment 104 by means of the watertight joints 113 to drive the machine to achieve rapid movement, levitation, and other functions.

The main body of the robot is carried by an alloy lightweight handle 204, and an existing expansion module, such as a DVL, a single-degree-of-freedom underwater robotic arm, a sonar, a binocular camera, and a laser rangefinder, is mounted through the reserved holes in the expansion skeleton 205, and is connected for use through a watertight joint 113 reserved on the fuselage.

As an improvement to the above solution, referring to FIG. 11 to FIG. 14, the underwater submersible robot further includes a mounting bottom plate 410 and at least two adaptive magnetization modules 4. The mounting bottom plate 410 is used for being removably connected to the fuselage 1, and the at least two adaptive magnetization modules 4 are connected to two sides of the mounting bottom plate 410. Each of the adaptive magnetization modules 4 includes: a lifting plate 401, a first small hydraulic rod 402, a second small hydraulic rod 403, a magnetization fixing module 404, a bearing plate 405, a second large hydraulic rod 406, a first large hydraulic rod 407, an adaptive adjustment holding mechanism 408, and a bottom connecting skeleton 409. An included angle formed by each of two sides of the bearing plate 405 and a middle position of the bearing plate 405 is an obtuse angle, and bottom sides of the two sides of the bearing plate 405 are each connected to the magnetization fixing module 404 by means of a plurality of sets of first small hydraulic rods 402 and second small hydraulic rods 403. The first small hydraulic rods 402 are connected to the second small hydraulic rods 403 in a hydraulic driving manner, and are capable of making linear motion relative to the second large hydraulic rods 406. Top sides of the two sides of the bearing plate 405 are each connected to the mounting bottom plate 410 by means of the second large hydraulic rods 406 and the first large hydraulic rods 407, and the first large hydraulic rods are connected to the second large hydraulic rods in a hydraulic driving manner.

Specifically, the adaptive magnetization module 4 is mainly used for fixation and attraction and stable movement along a column, and at the same time, is capable of effectively counteracting the strong ocean current disturbance encountered during the detection process.

The bottom of the fuselage of the underwater submersible robot and an adaptive controllable magnetization climbing module are tightly connected through screws and fixing holes, and the mounting bottom plate 410 is affixed to the bottom of the fuselage of the underwater submersible robot, which effectively serves as a supporting and stabilizing role. The adaptive adjustment holding mechanism 408 adopts a tilted diversion mode, which effectively reduces the influence of water resistance during the operation of the equipment and reduces the excess energy loss while achieving stable connection. When the equipment identifies and detects surface crack diseases of the underwater engineering, and when the equipment is close to the underwater engineering, the underwater submersible robot may adjust the rotational speed and steering of each propeller in a targeted manner, so that the equipment operates in a vertical state. At the same time, under the propeller drive, the equipment moves gradually close to the surface crack diseases of the underwater engineering in the vertical state, in this case, the adaptive controllable magnetization climbing module mounted at the bottom of the equipment achieves rapid and repeated magnetization and demagnetization of the interior of the magnetization fixing module 404 mounted at a lower end of the bearing plate 405 in the case of short electrical pulses, resulting in a huge magnetic force. As steel reinforcement is densely distributed inside an underwater engineering supporting column, the magnetization fixing module 404 may be quickly and stably attached to the surface of the underwater engineering supporting column, so that the whole set of equipment is stably attached to the surface of the underwater engineering supporting column. When the equipment is attached to the surface of the underwater engineering supporting column, the propellers in the horizontal direction of the equipment may increase the rotational speed, in which case the equipment may autonomously detect the attraction situation of the adaptive controllable magnetization climbing module for a stability warning test. When the rated detection rotational speed is reached and the equipment is still able to be stably attracted on the surface of the underwater engineering supporting column, the rotational speed of the propellers may return to a normal value for movement along the column surface and disease detection in the next step. Meanwhile, in the process of attachment, the equipment may adjust the opening and closing of the bottom connecting skeleton 409 in real time according to the radius of the underwater engineering supporting column. When the underwater engineering supporting column is thick, the bottom connecting skeleton 409 may flip upwards to expand a fixing space in the middle, and effectively expand the climbing radius of the adaptive controllable magnetization climbing module, so that the magnetization fixing module 404 is better attached to the surface of the underwater engineering supporting column, the height adaptability of the magnetization climbing module is effectively improved, and the breadth of application of the module may be expanded in a targeted manner. At the same time, when the magnetization fixing module 404 is fixed to the surface of the underwater engineering supporting column, the lifting plate located in the middle may gradually descend, so that the magnetization fixing module 404 at the bottom of the lifting plate 401 is attached to the surface of the underwater engineering supporting column, and the first large hydraulic rods 407 and the second large hydraulic rods 406 located at the top of the lifting plate may be adjusted in real time to make the magnetization fixing module 404 be attached to the surface of the underwater engineering supporting column smoothly. After the equipment is stably attached to the surface of the underwater engineering supporting column, the plurality of propellers located on the surface of the robot stably provide forward and backward power for the adaptive controllable magnetization climbing module, so that the equipment may stably operate on the surface of the column to achieve the function of stably searching for crack diseases on the surface of the column. The first large hydraulic rods 407 and the second large hydraulic rods 406 located at the top of the lifting plate 401 may be adjusted in real time, and the buffer adjustment of the hydraulic rods mainly plays a role in stabilizing the adaptive controllable magnetization climbing module of the equipment and reducing the pressure on the surface of the underwater engineering supporting column, thereby effectively dispersing a transverse water pressure as well as a pressure on the surface of the underwater engineering supporting column caused by the weight thereof, and avoiding other damages and impacts on the surface of the supporting column. At the same time, the first small hydraulic rods 402 and the second small hydraulic rods 403 located at the lower end of the bearing plate 405 may be adjusted in time when the magnetization fixing module 404 is fixed. When the equipment is affected by the water flow impact during the fixing process, the small hydraulic rod module is conducive to real-time adjustment and buffering to effectively reduce the influence and damage of the water flow impact on the whole equipment, and is also conducive to the establishment of a stable detection environment for the equipment to stably carry out disease detection at the crack disease position. When the equipment needs micro-angle steering adjustment, the magnetization fixing module 404 may reduce the magnetic force to produce a small gap between the module and the surface of the underwater engineering supporting column, the propellers of the equipment may be adjusted in time to achieve turning adjustment of the main engine, and after the equipment is adjusted, the magnetization fixing module 404 may increase the intensity of short electrical pulses to greatly increase the maximum magnetic force, so that the equipment may be rapidly attracted on the surface of the underwater engineering supporting column again to complete the turning adjustment of any micro angle during operation, thereby achieving the accuracy and pertinence of a disease detection site, and effectively improving the accuracy and reliability of underwater engineering disease detection.

Figure 13:
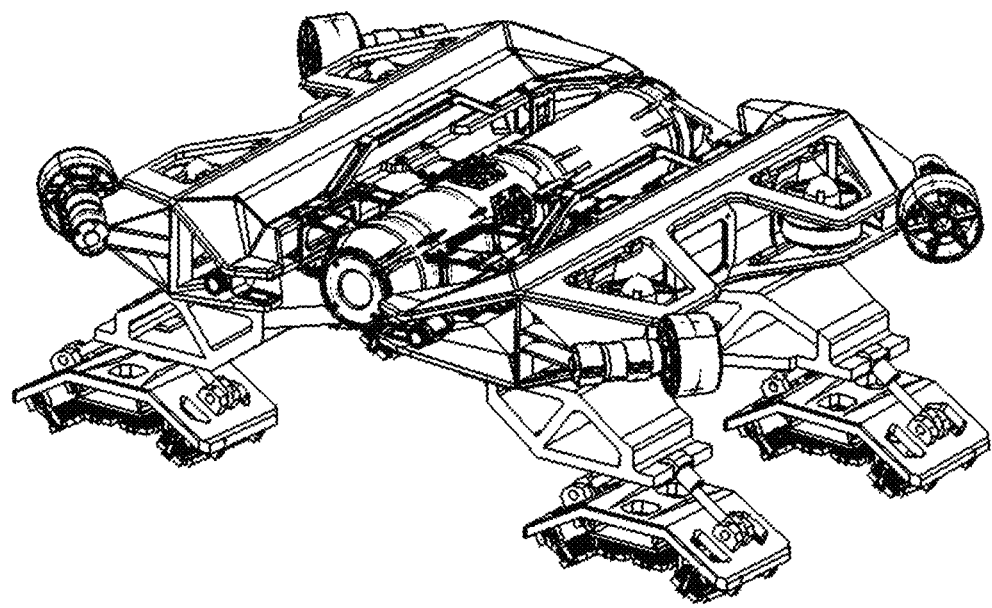
FIG. 13 is a schematic installation diagram of an adaptive magnetization module of an underwater submersible robot according to an embodiment of the present invention.
Figure 14:
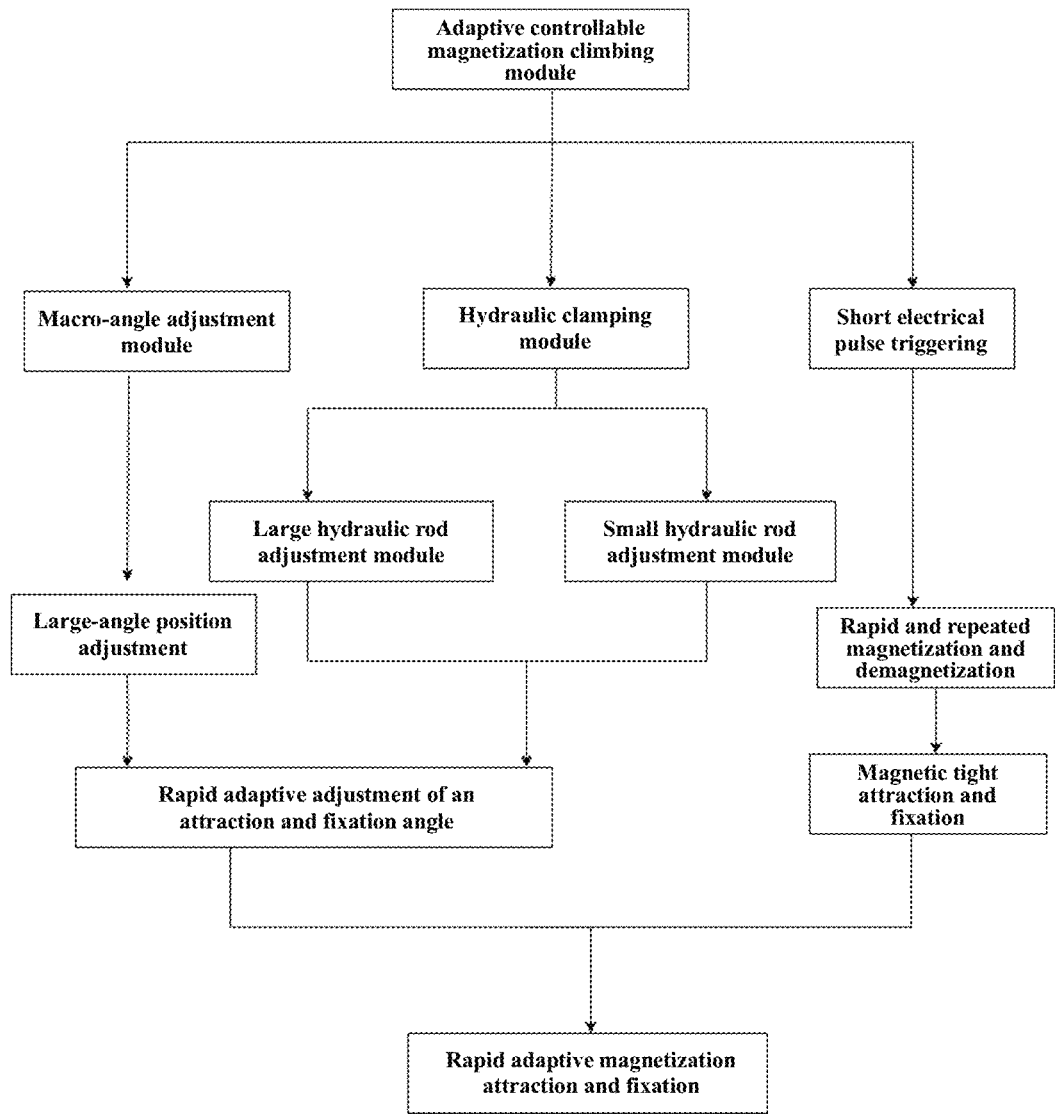
FIG. 14 is a schematic operational flow diagram of an adaptive magnetization module of an underwater submersible robot according to an embodiment of the present invention.
Figure 15:
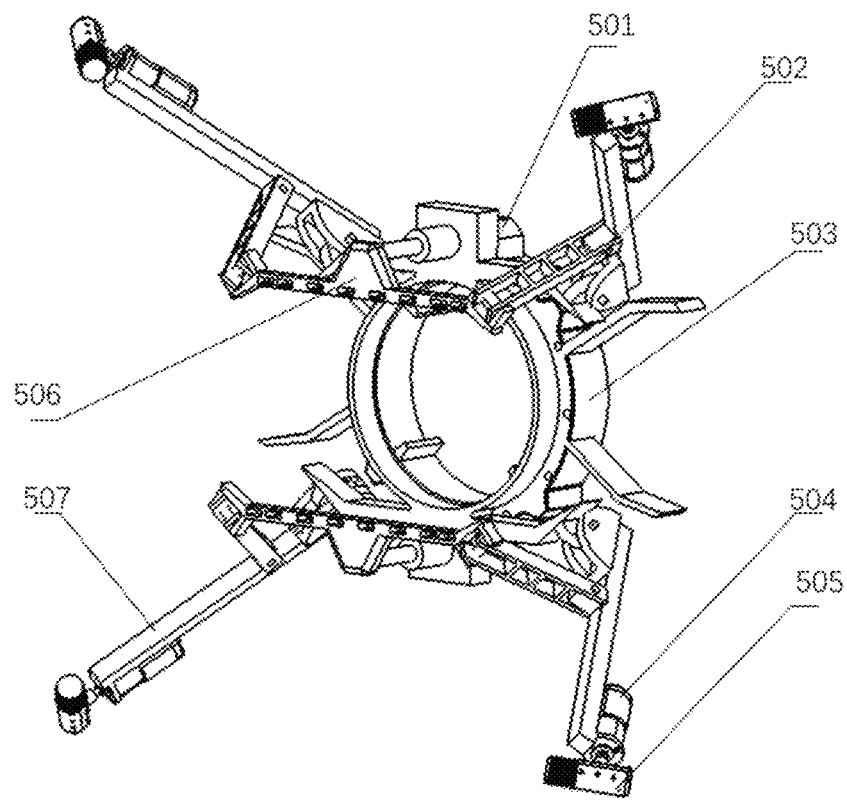
FIG. 15 is a schematic structural diagram of an underwater vision module of an underwater submersible robot according to an embodiment of the present invention.

FIG. 13 shows an operational flow diagram of the adaptive controllable magnetization climbing module. The operational process of the adaptive controllable magnetization climbing module is divided into a macro-angle adjustment module, a hydraulic clamping module, and short electrical pulse triggering. During the operation of the adaptive controllable magnetization climbing module, the macro-angle adjustment module adjusts the position of the equipment at a large angle; in this case, the hydraulic clamping module synchronously carries out multi-stage adjustment, to effectively achieve an attraction and fixation angle under the multi-stage reaction of a large and small hydraulic rod adjustment module, and at the same time, may achieve rapid adaptive adjustment; and under the short electrical pulse triggering at the bottom, the magnetization fixing module at the lower end effectively achieves the effect of magnetic tight attraction and fixation through rapid and repeated magnetization and demagnetization, and finally, adaptive rapid and stable attraction and fixation are achieved. When an identification module operates, the magnetization fixing module is in an operating state, so that the equipment is firmly fixed on the surface of the underwater engineering supporting column, allowing the equipment to be fixed in a stable detection environment. In this case, the ultra definition camera 121 recognizes underwater engineering diseases under the machine, and may transmit images back rapidly. When the detection is completed, the equipment may rapidly respond to search for the next disease site.

Figure 9:
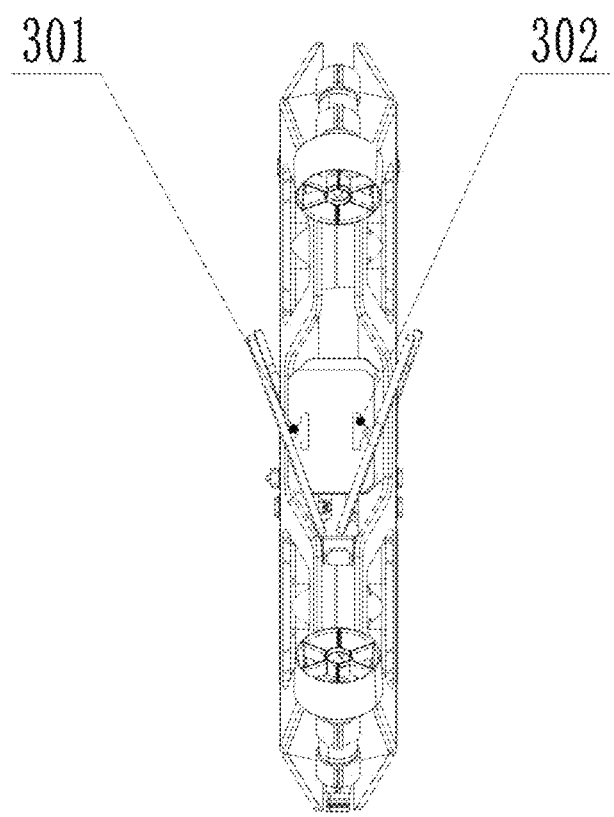
FIG. 9 is a schematic structural diagram of a motion assisting module of an underwater submersible robot according to an embodiment of the present invention.
Figure 10:
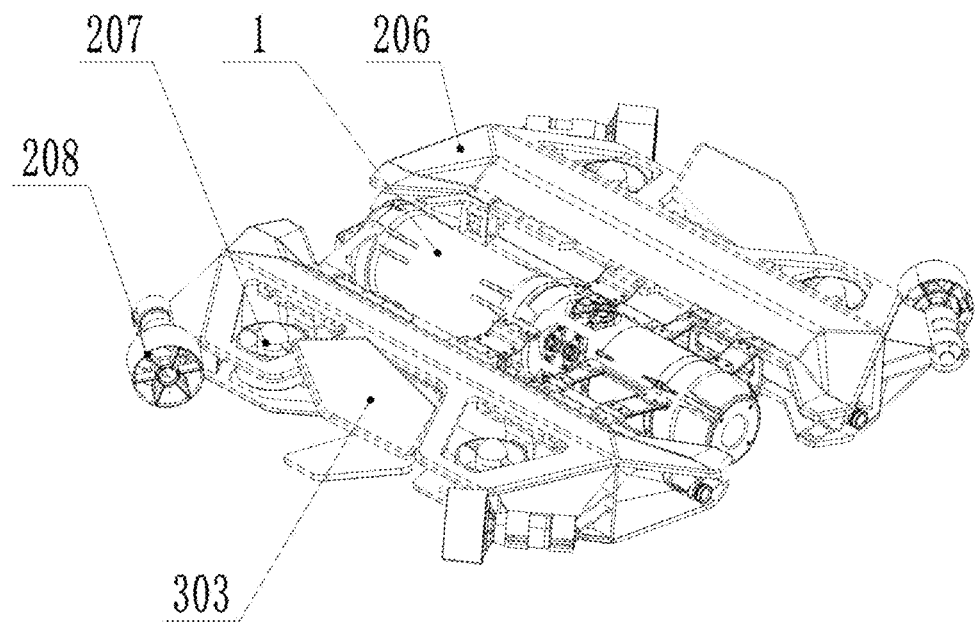
FIG. 10 is a schematic installation diagram of a motion assisting module of an underwater submersible robot according to an embodiment of the present invention.
Figure 11:
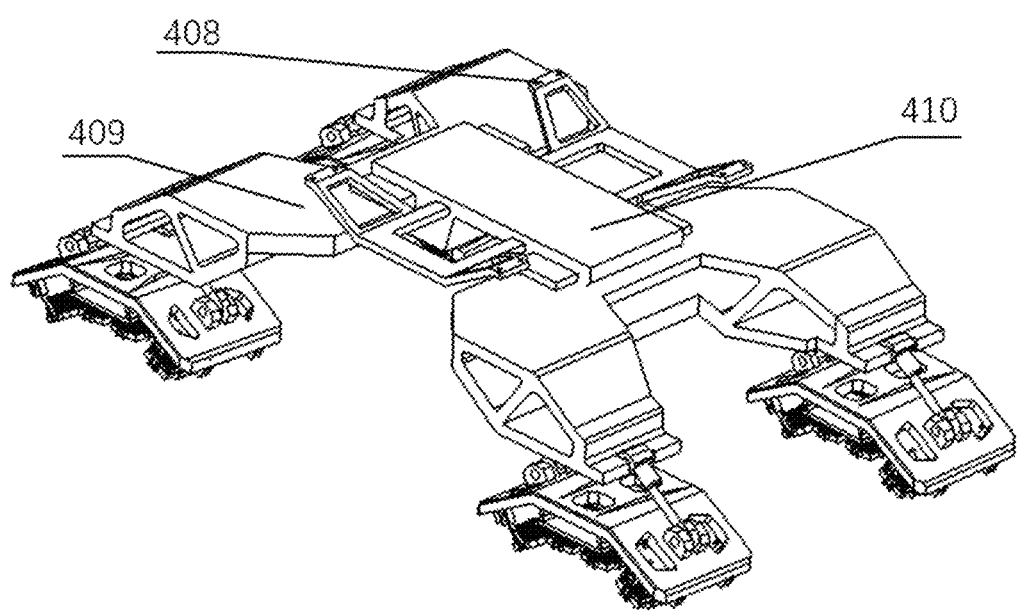
FIG. 11 is a schematic structural diagram of an adaptive magnetization module of an underwater submersible robot according to an embodiment of the present invention.
Figure 12:
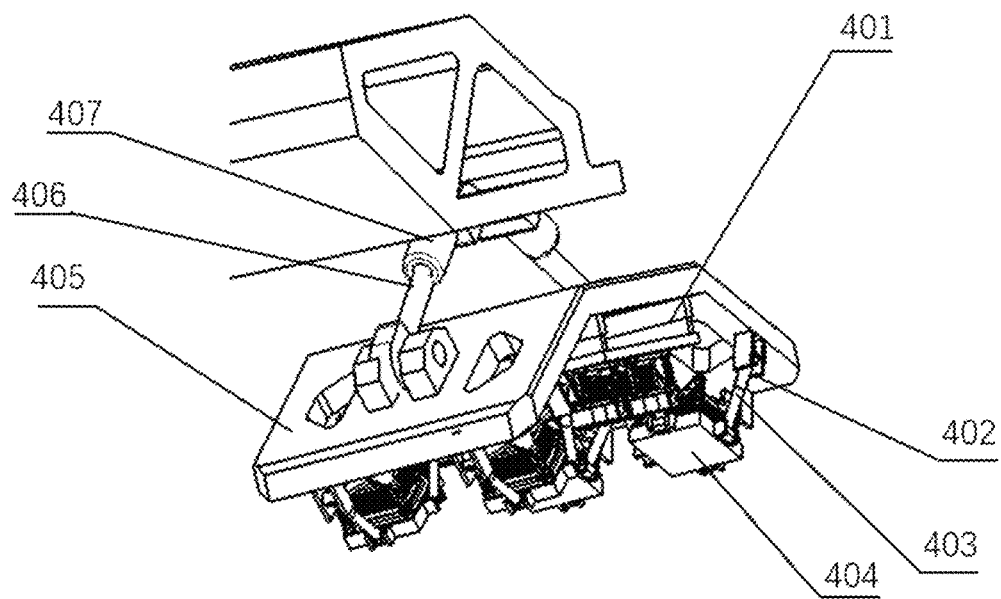
FIG. 12 is a schematic detailed diagram of an adaptive magnetization module of an underwater submersible robot according to an embodiment of the present invention.

As an improvement to the above solution, referring to FIG. 9 and FIG. 10, the underwater submersible robot further includes two pairs of motion assisting modules 3 disposed on the two sides of the fuselage 1. Each of the motion assisting modules 3 includes a fixing support 301, a motor 302, and a spoiler 303, where the fixing support 301 is disposed on one side of the fuselage 1, the spoiler 303 is disposed on the fixing support 301 in a manner of rotating up and down, and the motor 302 is disposed on the fuselage 1 and used for driving the spoiler 303 to move up and down.

Specifically, when the equipment (i.e., the underwater submersible robot) operates underwater, the motion assisting modules maintain a standby state at all times. When the equipment needs to brake quickly during operation, the motor 302 mounted on the fixing support 301 operates synchronously while the propellers decelerate and thrust reversely, and the spoiler 303 located around the fuselage is unfolded outward along the fuselage under the drive of the motor 302, to expand the area of water resistance and increase the running resistance of the equipment, so that the operation speed of the equipment decreases rapidly, and the function of rapid mechanical risk avoidance is achieved. When the equipment needs to make a quick turn, in the case that the equipment turns sharply to the right, the spoiler 303 on the side is quickly started while the operation speed of the propellers is adjusted, the flow rate of the right side instantly increases under the action of the spoiler 303, the pressure is rapidly reduced, and the fuselage of the equipment may also quickly turn to the right under the drive of the difference in pressure, so that the equipment may quickly turn to avoid danger under the combined action of the spoiler 303 and the propellers. The same is true for the sharp turn to the left side, thereby achieving the highly sensitive movement of the underwater submersible robot.

As an improvement to the above solution, referring to FIG. 15 to FIG. 18, the detection apparatus 2 includes an underwater vision matrix module 5. The underwater vision matrix module 5 includes: a matrix collar 503 and at least two camera adjustment assemblies. The matrix collar 503 is used for being removably mounted on the fuselage 1. The at least two camera adjustment assemblies are uniformly distributed on the same side of the matrix collar 503. Each of the camera adjustment assemblies includes: linear actuators 501, a clamping plate 502, a waterproof motor 504, a waterproof camera 505, a motion frame 506, and a hinged motion frame 507, where a bottom end of the hinged motion frame 507 is hinged to the matrix collar 503, a top end of the hinged motion frame 507 is provided with the waterproof motor 504, a free end of a rotating shaft of the waterproof motor 504 is provided with the waterproof camera 505, one end of the clamping plate 502 is connected to a middle position of the hinged motion frame 507, the other end of the clamping plate 502 is connected to one end of the motion frame 506, the other end of the motion frame 506 is connected to one end of the clamping plate 502 of another camera adjustment assembly, the other end of the clamping plate 502 of another camera adjustment assembly is connected to the middle position of the hinged motion frame 507 of the camera adjustment assembly, the linear actuators 501 are disposed on the matrix collar 503, and a free end of a push rod of each linear actuator 501 is connected to a middle position of the motion frame 506.

Specifically, the underwater vision matrix module 5 is configured to acquire a high-quality data set and a larger field of view.

When the equipment identifies and detects crack diseases on the surface of the underwater engineering, and when the equipment is close to the underwater engineering, the linear actuators 501 located at the upper and lower ends are activated according to the distance between the equipment and the detection target, so as to push the motion frame 506 to move forward, and while the motion frame 506 moves forward, the hinged motion frame 507 which is connected to the motion frame 506 through the clamping plate 502 also moves forward to be gradually close to the detection target. When the hinged motion frame 507 moves to be close to the detection target, the waterproof motor 504 located at the tail end of the hinged motion frame 507 is started, and the waterproof motor 504 rotates in combination with the distance and angle relationship between the waterproof camera 505 and the detection target, so as to drive the waterproof camera 505 to rotate synchronously, so that the field of view of the waterproof camera 505 surrounds the detection target in all directions for detection, thereby improving the detection coverage and accuracy, also effectively expanding the detection field of view and increasing the detection speed, and greatly improving the operation efficiency and detection accuracy.

Figure 16:
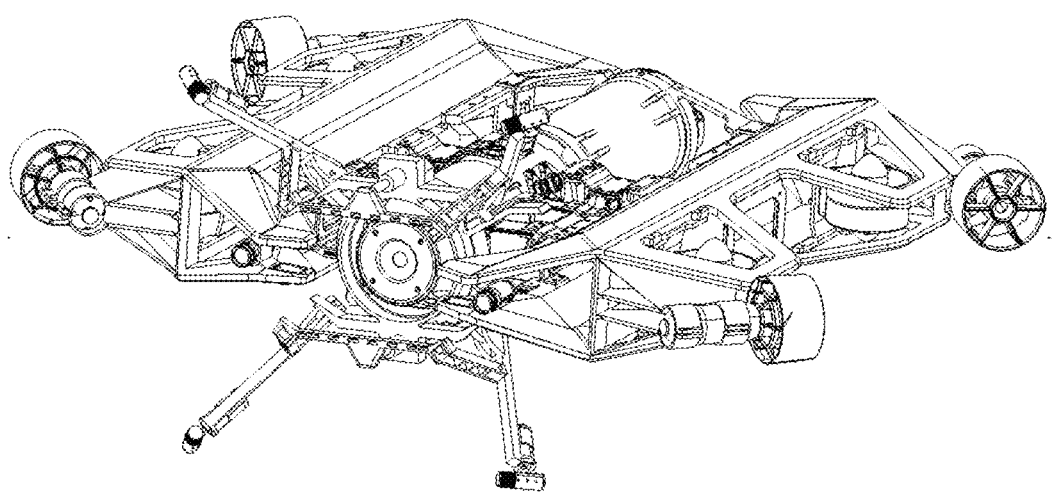
FIG. 16 is a schematic installation diagram of an underwater vision module of an underwater submersible robot according to an embodiment of the present invention.
Figure 17:
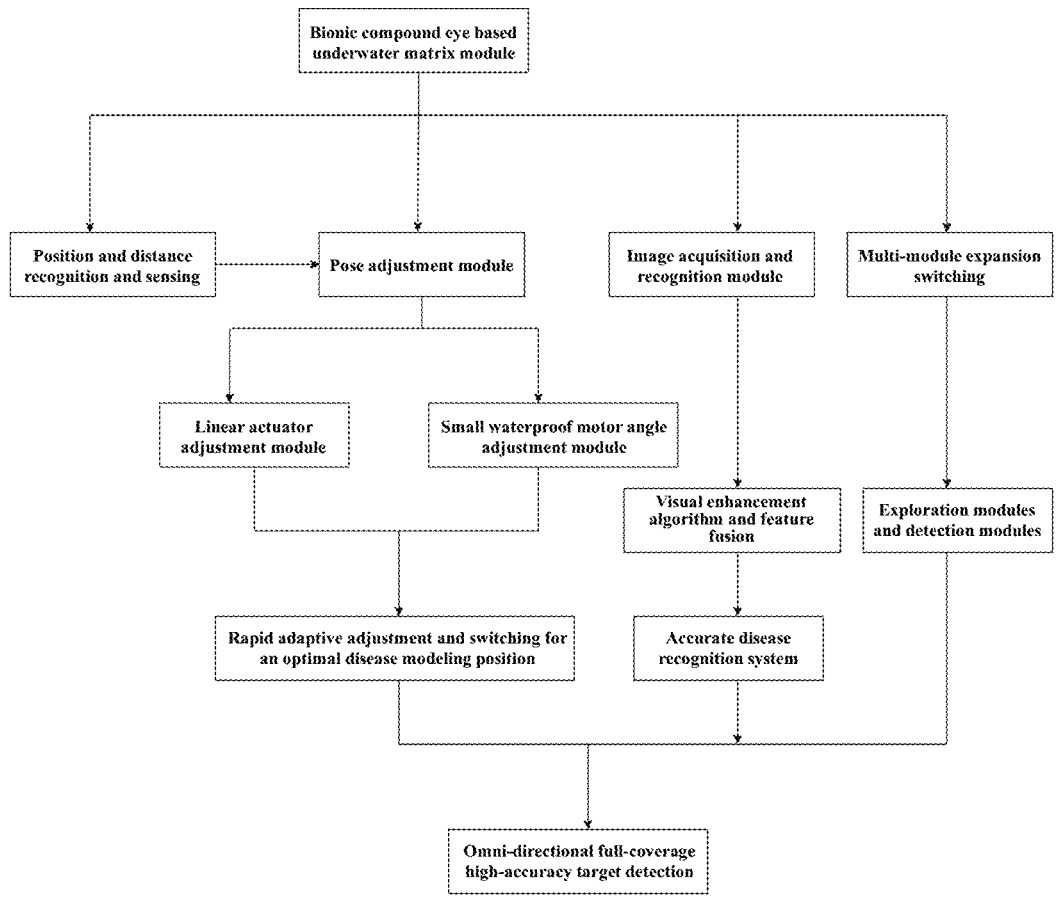
FIG. 17 is a schematic operational flow diagram of an underwater vision module of an underwater submersible robot according to an embodiment of the present invention.
Figure 18:
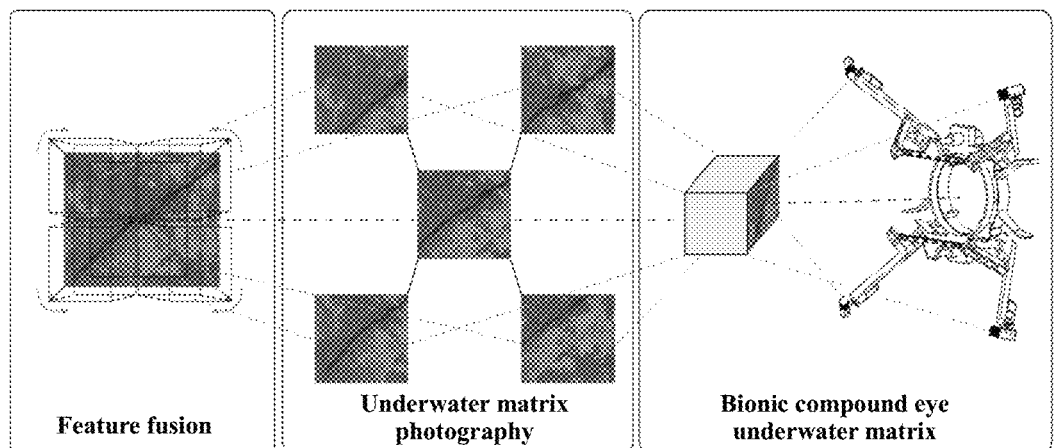
FIG. 18 is a flow diagram of a processing algorithm of an underwater vision module of an underwater submersible robot according to an embodiment of the present invention.
Figure 19:
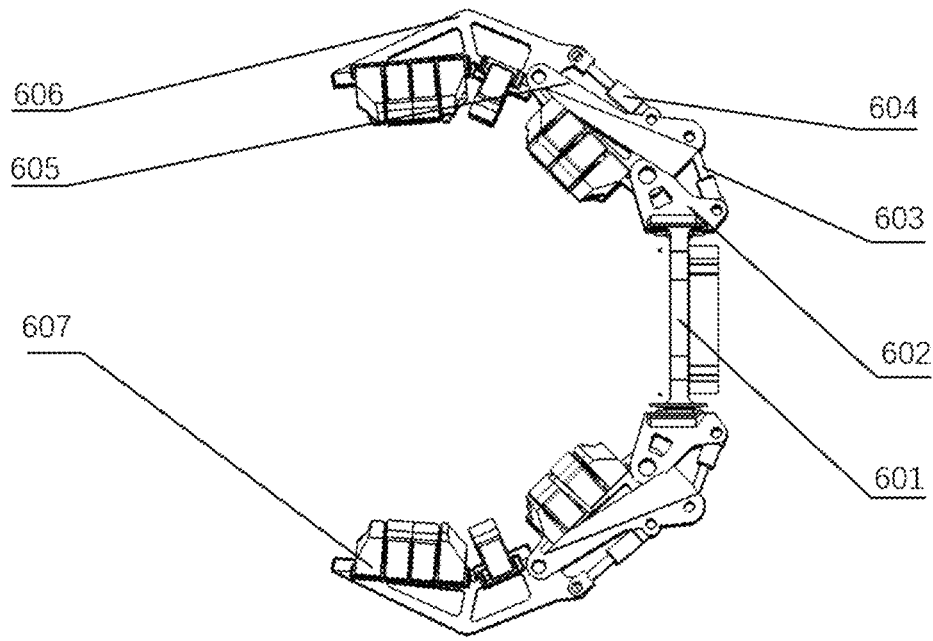
FIG. 19 is a schematic structural diagram of a variable stiffness flexible hoop self-stabilizing module of an underwater submersible robot according to an embodiment of the present invention.
Figure 20:
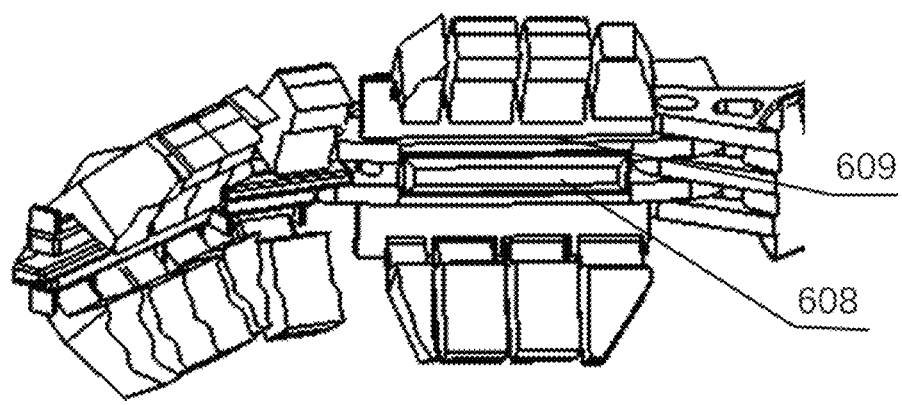
FIG. 20 is a schematic detailed diagram of a variable stiffness flexible hoop self-stabilizing module of an underwater submersible robot according to an embodiment of the present invention.

FIG. 16 and FIG. 17 show a bionic compound eye based underwater matrix module and an operational flow diagram of an algorithm thereof. The bionic compound eye based underwater matrix module acquires relevant position and distance information after position and distance recognition and sensing, which serves as a condition for the operation of a pose adjustment module, and the module drives a linear actuator adjustment module and a small waterproof motor angle adjustment module to accurately adjust and change the pose of the equipment, so as to achieve rapid adaptive adjustment and switching for the optimal disease modeling position. During adjustment, an image acquisition and recognition module located at the front end integrates the visual enhancement algorithm and feature fusion to construct an accurate disease recognition system, so as to achieve rapid and accurate recognition and identification of underwater engineering diseases. At the same time, according to the required use, the equipment may be subjected to multi-module expansion switching, including underwater exploration and water body detection modules and other exploration modules, and ultimately the omni-directional full-coverage high-accuracy target recognition and detection of underwater engineering diseases are effectively achieved. A feature fusion module is responsible for splicing collected omni-directional target images into a target image with more comprehensive and obvious features, and the module includes five operations: preprocessing, feature extraction, feature matching, image alignment, and image fusion. Images taken underwater may have scattering, color distortion and other phenomena, for which pre-processing is required before feature fusion, including color correction and scattering removal. With regard to color correction, histogram equalization is used to improve the color accuracy of the images, which makes the features of the original gray images more obvious. With regard to scattering removal, wavelet denoising is used to reduce the influence of scattering in the underwater environment, taking into account scattering noise and background noise contained in the images. The feature extraction operation aims to extract features from each image, where key points with scale invariance and rotation invariance are extracted using the SIFT algorithm, and corresponding descriptors are generated. After obtaining the descriptors of the features, feature matching of the images is carried out, and a descriptor-based least squares algorithm is used to find the corresponding relationship between these features, so as to determine the relative positions and attitudes of the features. After determining the relative information of the features, image alignment is carried out, and on the basis of results of matching, an affine transformation model is used to align the images. Finally, the aligned features are subjected to image fusion: after alignment of the image features, the pixel-level fusion method of weighted averaging is used for image fusion, and then the mean smoothing method is used to reduce the obvious excessive edges at the splicing position to further improve the quality of the image.

As an improvement to the above solution, referring to FIG. 19 to FIG. 22, the underwater submersible robot further includes variable stiffness flexible hoop self-stabilizing modules 6. The variable stiffness flexible hoop self-stabilizing module 6 includes a main fixing frame 601, a pair of hydraulic mechanical claws 60, variable stiffness cladding arrays 607, gap-filling cladding inflatable units, and carbon fiber interlayers 609. The main fixing frame 601 is used for being removably connected to the fuselage 1. The pair of hydraulic mechanical claws 60 are disposed on two sides of the main fixing frame 601 respectively in a manner of moving close to or away from each other. The variable stiffness cladding arrays 607 are disposed on two sides of free ends of inner sides of the pair of hydraulic mechanical claws 60. The gap-filling cladding inflatable units are disposed in middle positions of the inner sides of the pair of hydraulic mechanical claws 60. The gap-filling cladding inflatable units are covered with the carbon fiber interlayers 609.

Specifically, the variable stiffness flexible hoop self-stabilizing modules 6 are used for efficient detection of pile foundation type diseases and counteraction against ocean current disturbance.

The variable stiffness flexible hoop self-stabilizing module 6 is mounted on the detection head cover 101 of the main body compartment 1. The hydraulic mechanical claws 60 are connected and fixed to the detection head cover 101 through the main fixing frame 601. The detection head cover 101 is provided with clamping bosses 151, and four clamping bosses 151 are distributed along the circumference and provided with holes 150, and fix the main fixing frame 601 through screws. The main fixing frame 601 is connected to the hydraulic mechanical claws 60. The hydraulic mechanical claw 60 includes a front hydraulic component 603, a rear hydraulic component 604, a mechanical claw front section 602, a mechanical claw middle section 605, and a mechanical claw tail section 606. During operation, the front hydraulic component 603 extends out firstly, and then the rear hydraulic component 604 extends out to drive the mechanical claw front section 602, the mechanical claw middle section 605, and the mechanical claw tail section 606 of the hoop self-stabilizing module 6 to be closed. After a mechanical claw body wraps an object, the carbon fiber interlayer 609 located in the middle portion may be in contact with the surface of the target object to play a supporting role. After stabilization is achieved, the interior of the gap-filling cladding units 608 is filled with air under the drive of a gear air pump, in which process the surfaces of the gap-filling cladding units 608 may be in close contact with the target object to achieve flexible full-coverage attachment to the surface of the target object to improve attachment stability. After the gap-filling cladding units 608 complete the first level of attachment, the variable stiffness cladding arrays 607 carry out secondary flexible attachment operation, and the variable stiffness cladding arrays may be further attached to the surface of the target object to improve the rigidity of a cladding contact surface. By means of the multi-level attachment, the stability of the equipment for grasping the object is greatly improved. Two variable stiffness flexible hoop self-stabilizing modules 6 are provided in total, distributed at the front end of the machine, and may pick up large underwater objects in any shape in a non-destructive manner to complete the sampling operation. In addition to the non-destructive sampling function, in the implementation of underwater engineering disease detection work, in order to prevent ocean currents from disturbing the robot to result in poor imaging quality at the diseases, the mechanical claws are driven by the hydraulic components 604 to hoop an underwater pile foundation, and the gap-filling cladding units 608 and the variable stiffness cladding arrays 607 are used for achieving a non-destructive tight hoop for the surface of the pile foundation, thereby achieving stable imaging of the fuselage.

During operation, after the variable stiffness flexible hoop self-stabilizing modules 6 hoop a designated pile foundation, the battery 139 supplies power, the ultra definition camera 121 recognizes images in front of the machine and may transmit the images back, the brushless motor propellers operate to achieve vertical movement of the machine to the disease position, and then the ultra definition camera 121 carries out the detection operation, thereby obtaining a high-quality pile foundation damage dataset.

Figure 21:
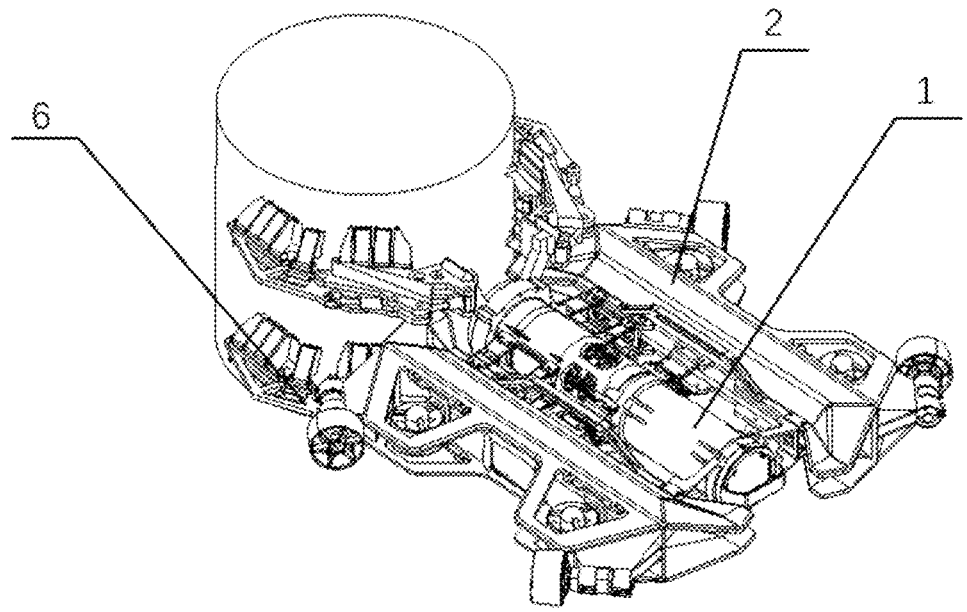
FIG. 21 is a schematic working diagram of a variable stiffness flexible hoop self-stabilizing module of an underwater submersible robot according to an embodiment of the present invention.
Figure 22:
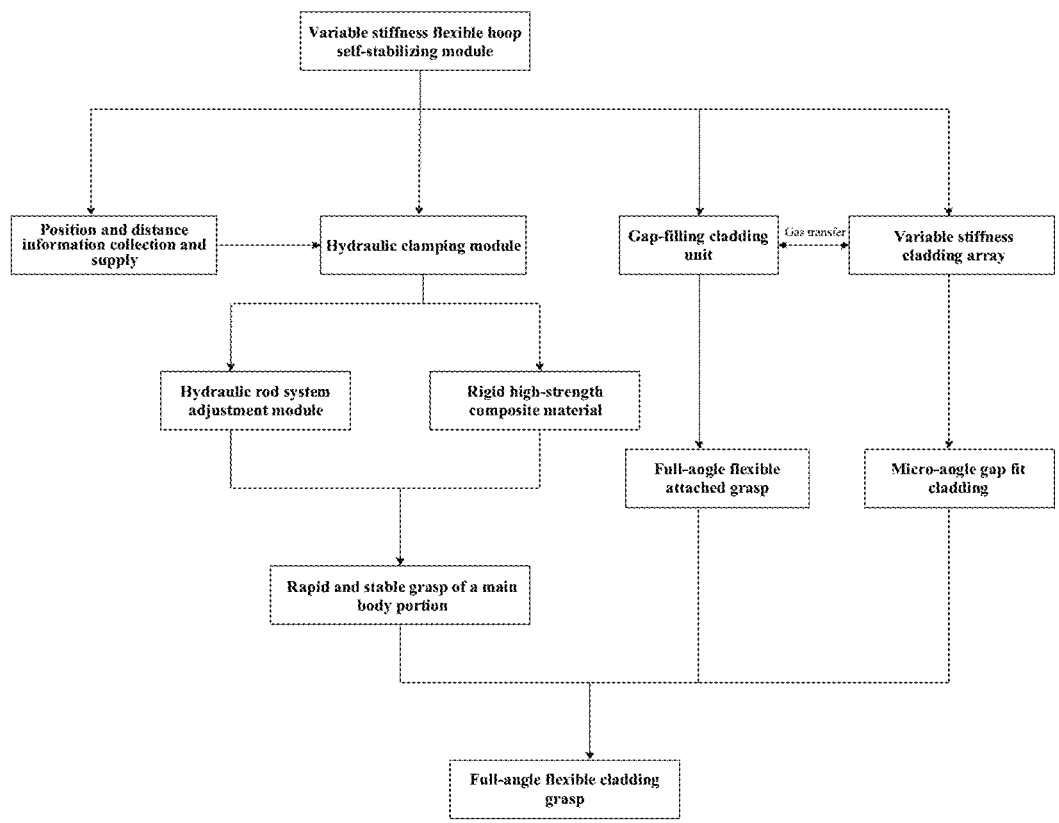
FIG. 22 is a schematic operational logic diagram of a variable stiffness flexible hoop self-stabilizing module of an underwater submersible robot according to an embodiment of the present invention.

FIG. 21 shows a schematic operational logic diagram of the variable stiffness flexible hoop self-stabilizing module. Position and distance information collection at the front end achieves information supply for a control center. The hydraulic mechanical claws are made of rigid high-strength composite materials, and effectively resist the harsh operating environment underwater. At the same time, the hydraulic rod system carries out targeted adjustment on the opening and closing amplitude and size of the hydraulic mechanical claws, to achieve adaptive adjustment for the target object, and achieve rapid and stable grasp of the fuselage portion of the target object. During operation of the hydraulic mechanical claws, the gap-filling cladding units operate synchronously, and the interior of the units is filled with air under the action of the gear air pump according to data fed back by a pressure sensor, so as to achieve full-angle flexible attached grasp of the target object. At the same time, the variable stiffness cladding arrays carry out targeted filling on the remaining gaps, so that the inner sides of the hydraulic mechanical claws fully cover the surface of the target object, thereby achieving micro-angle gap fit cladding, and ultimately achieving full-angle flexible cladding grasp.

Figure 23:
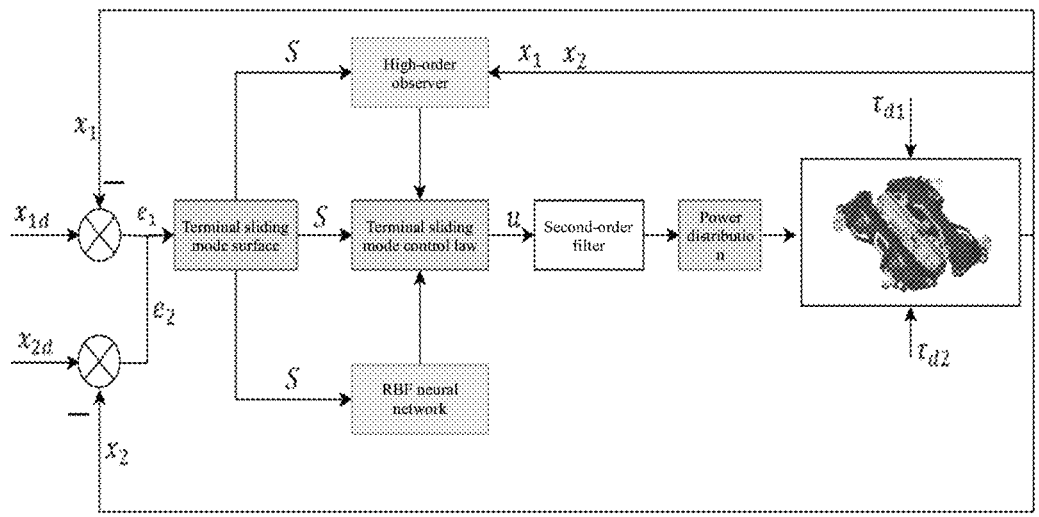
FIG. 23 is a schematic diagram of an active disturbance rejection intelligent control strategy of an underwater submersible robot according to an embodiment of the present invention.
Figure 24:
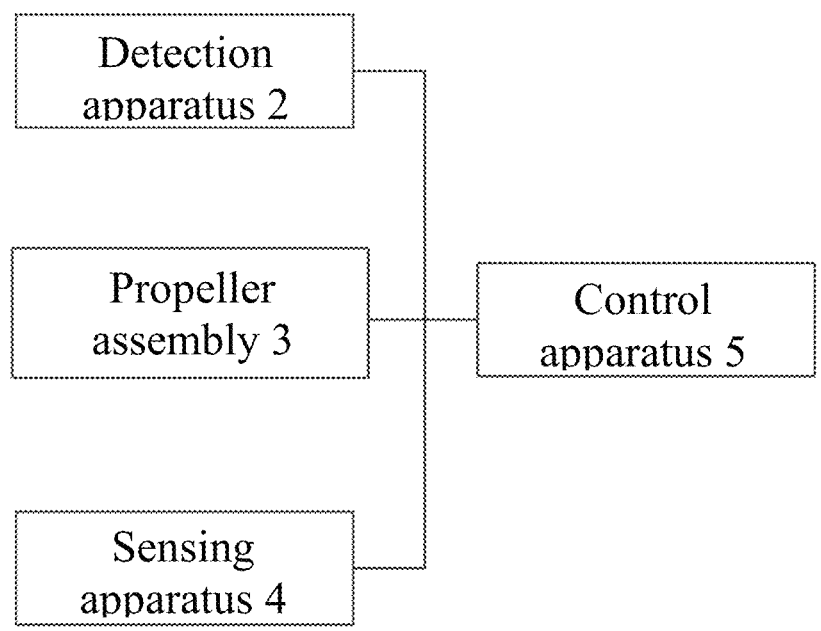
FIG. 24 is a schematic structural diagram of a control system for an underwater submersible robot according to an embodiment of the present invention.
Figure 25:
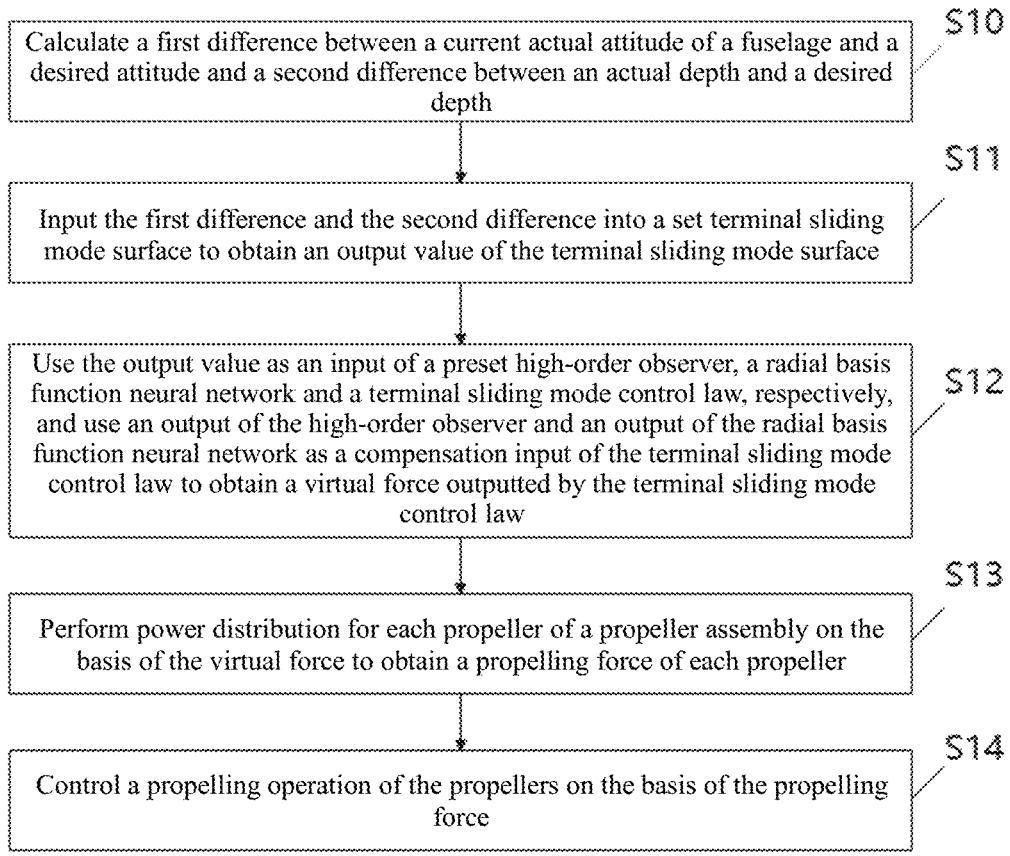
FIG. 25 is a schematic flow diagram of a control method for an underwater submersible robot according to an embodiment of the present invention.

FIG. 23 and FIG. 25 are schematic flow diagrams of a control method for an underwater submersible robot according to an embodiment of the present invention. The control method for the underwater submersible robot is implemented by the control apparatus 9 for the underwater submersible robot. The method applied to the underwater submersible robot according to any one of the embodiments described above includes steps S10 to S14:

S10: Calculate a first difference between a current actual attitude of a fuselage and a desired attitude and a second difference between an actual depth and a desired depth.

S11: Input the first difference and the second difference into a set terminal sliding mode surface to obtain an output value of the terminal sliding mode surface.

S12: Use the output value as an input of a preset high-order observer, a radial basis function neural network and a terminal sliding mode control law, respectively, and use an output of the high-order observer and an output of the radial basis function neural network as a compensation input of the terminal sliding mode control law to obtain a virtual force outputted by the terminal sliding mode control law.

S13: Perform power distribution for each propeller of a propeller assembly on the basis of the virtual force to obtain a propelling force of each propeller.

S14: Control a propelling operation of the propellers on the basis of the propelling force.

In the embodiment of the present invention, the first difference between the current actual attitude of the fuselage and the desired attitude and the second difference between the actual depth and the desired depth are calculated; the first difference and the second difference are inputted into the set terminal sliding mode surface to obtain the output value of the terminal sliding mode surface; the output value is used as the input of the preset high-order observer, the radial basis function neural network, and the terminal sliding mode control law, respectively, and the output of the high-order observer and the output of the radial basis function neural network are used as the compensation input of the terminal sliding mode control law, so that a data deviation may be compensated for the current underwater turbulence, and the terminal sliding mode control law may ultimately output a more accurate virtual force; power distribution is carried out for each propeller of the propeller assembly on the basis of the virtual force to obtain the propelling force of each propeller; the propellers of the underwater submersible robot are controlled to operate on the basis of the propelling force. Thus, more reasonable motion control may be carried out for the current underwater disturbance. It can be seen that the embodiment of the present invention may improve the anti-disturbance capacity of the underwater submersible robot against underwater turbulence, so as to achieve the autonomous fuselage stabilization under the complex environment and the autonomous extrication operation under the emergency environment, which effectively achieves the autonomous strong anti-disturbance function, improves the operation safety and stability of the equipment, and reduces the occurrence probability of accidents of the equipment. Moreover, based on the control strategy, the intelligent operation of the underwater unmanned aerial vehicle is achieved, the efficiency of underwater engineering detection is substantially improved, the safety of underwater engineering detection work is effectively improved, the need for divers to directly participate in the operation is eliminated, and the risk faced by the staff when operating in the underwater environment is greatly reduced.

As an improvement on the above solution, the performing power distribution for each propeller of a propeller assembly on the basis of the virtual force to obtain a propelling force of each propeller includes:

filtering the virtual force using a second-order filter, and converting the filtered virtual force into the propelling force of each propeller of the propeller assembly by power distribution.

It is to be noted that the relevant solution contents of the above-described embodiment of the control method for the underwater submersible robot may correspondingly refer to the solution contents of the above-described embodiment of the control apparatus 9 for the underwater submersible robot, which will not be repeated herein.

Figure 26:
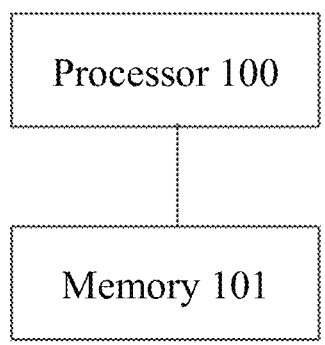
FIG. 26 is a schematic structural diagram of a control apparatus for an underwater submersible robot according to an embodiment of the present invention.

FIG. 26 is a schematic diagram of a control apparatus 9 for an underwater submersible robot according to an embodiment of the present invention. The control apparatus 9 for the underwater submersible robot according to this embodiment includes: a processor 1000, a memory 1001, and a computer program stored in the memory 1001 and runnable on the processor 1000, for example, a control program for the underwater submersible robot. The processor 1000, when executing the computer program, implements the steps in the above-described embodiments of the control method for the underwater submersible robot.

Exemplarily, the computer program may be partitioned into one or more modules/units, and the one or more modules/units are stored in the memory and executed by the processor to implement the present invention. The one or more module/units may be a series of computer program instruction segments capable of accomplishing a particular function, and the instruction segments are used to describe the execution process of the computer program in the control apparatus 9 for the underwater submersible robot.

The control apparatus 9 for the underwater submersible robot may include, but is not limited to, a processor and a memory. A person skilled in the art may appreciate that the schematic diagrams are merely examples of the control apparatus 9 for the underwater submersible robot and do not constitute a limitation on the control apparatus 9 for the underwater submersible robot. The control apparatus may include more or less components than shown, or a combination of some components, or different components. For example, the control apparatus 9 for the underwater submersible robot may also include input and output devices, network access devices, buses, etc.

The processor may be a central processing unit (CPU), or other general-purpose processors, digital signal processors (DSPs), application specific integrated circuits (ASICs), field-programmable gate arrays (FPGAs) or other programmable logic devices, discrete gate or transistor logic devices, discrete hardware components, and so on. The general-purpose processors may be microprocessors or any conventional processor, etc. The processor is a control center of the control apparatus 9 for the underwater submersible robot, and is connected to each part of the entire control apparatus 9 for the underwater submersible robot via various interfaces and lines.

The memory may be used for storing the computer program and/or modules, and the processor implements various functions of the control apparatus 9 for the underwater submersible robot by running or executing the computer program and/or modules stored in the memory and invoking data stored in the memory. The memory may mainly include a program storage region and a data storage region. The program storage region may store applications required for an operating system and at least one function. The data storage region may store data created according to the use of a mobile phone. In addition, the memory may include a high-speed random access memory, or a non-volatile memory, such as a hard disk, an internal memory, a plug-in hard disk, a smart media card (SMC), a secure digital (SD) card, a Flash card, at least one disk memory device, a flash memory device, or other volatile solid-state memory devices.

The modules/units integrated on the control apparatus 9 for the underwater submersible robot, if implemented in the form of a software functional unit and sold or used as a stand-alone product, may be stored in a computer-readable storage medium. Based on such understanding, the present invention may also implement all or part of the processes of the method in the above embodiment by instructing relevant hardware by means of a computer program. The computer program may be stored in a computer-readable storage medium, and the computer program, when executed by a processor, may implement the steps of the method embodiments described above. The computer program includes a computer program code, and the computer program code may be in a form of source code, object code, executable file or some intermediate forms. The computer-readable medium may include: any entity or device capable of carrying the computer program code, a recording medium, a USB flash drive, a mobile hard disk drive, a diskette, a compact disk, a computer memory, a read-only memory (ROM), a random access memory (RAM), an electrical carrier signal, a telecommunication signal, and a software distribution medium, etc. It is to be noted that the computer-readable medium may contain content which is subject to appropriate additions and subtractions as required by legislation and patent practice in jurisdictions, for example, in some jurisdictions, the computer-readable medium does not include the electrical carrier signal or the telecommunication signal in accordance with legislation and patent practice.

It is to be noted that the apparatus embodiments described above are merely illustrative. The units described as separate components may or may not be physically separated, and the components displayed as units may or may not be physical units, that is, they may be located in one place, or distributed to multiple network units. Some or all of the modules may be selected according to actual needs to achieve the purpose of the solutions of the embodiments. In addition, in the accompanying drawings of the apparatus embodiments provided by the present invention, the connection relationship between the modules indicates that they have a communication connection therebetween, which may be specifically implemented as one or more communication buses or signal lines. Those of ordinary skill in the art can understand and implement it without creative work.

While the foregoing is directed to the preferred embodiments of the present invention, it should be noted that several improvements and modifications can be made by persons of ordinary skill in the art without departing from the principle of the present invention, and such improvements and modifications shall also fall within the scope of protection of the present invention.

The invention claimed is:

1. An underwater submersible robot, characterized by comprising:
    a fuselage;
    a detection apparatus, disposed on the fuselage and configured to detect an underwater target;
    a propeller assembly, disposed on the fuselage and configured to drive the underwater submersible robot underwater;
    a sensing apparatus, disposed on the fuselage and configured to sense an attitude and depth of the fuselage; and
    a control apparatus, disposed on the fuselage, connected to the detection apparatus, the sensing apparatus and the propeller assembly, and configured to:
    calculate a first difference between a current actual attitude of the fuselage and a desired attitude and a second difference between an actual depth and a desired depth;
    input the first difference and the second difference into a set terminal sliding mode surface to obtain an output value of the terminal sliding mode surface;
    use the output value as an input of a preset high-order observer, a radial basis function neural network and a terminal sliding mode control law, respectively, and use an output of the high-order observer and an output of the radial basis function neural network as a compensation input of the terminal sliding mode control law to obtain a virtual force outputted by the terminal sliding mode control law;
    perform power distribution for each propeller of the propeller assembly on the basis of the virtual force to obtain a propelling force of each propeller; and
    control a propelling operation of the propellers on the basis of the propelling force.

2. The underwater submersible robot according to claim 1, characterized in that the control apparatus, when configured to perform power distribution for each propeller of the propeller assembly on the basis of the virtual force to obtain a propelling force of each propeller, is specifically configured to:
    filter the virtual force using a second-order filter, and convert the filtered virtual force into the propelling force of each propeller of the propeller assembly by power distribution.

3. The underwater submersible robot according to claim 1, characterized in that the propeller assembly comprises four propellers, the four propellers are disposed at two ends of two sides of the fuselage respectively in a manner of rotating up and down and left and right, and the four propellers are connected to the control apparatus.

4. The underwater submersible robot according to claim 1, characterized in that the fuselage comprises a main body compartment, two alloy skeletons and two streamlined shells; the two alloy skeletons are disposed on two sides of the main body compartment respectively in a manner of rotating around an axial direction of the main body compartment; and the two streamlined shells enclose the two alloy skeletons in a one-to-one correspondence manner and are correspondingly connected to the two alloy skeletons.

5. The underwater submersible robot according to claim 4, characterized in that the main body compartment comprises, in a lengthwise direction, a detection head cover, a coupling portion, a control compartment shell, a special-shaped compartment, a control compartment cover, a battery compartment cover, a battery compartment shell, a compartment cover transition section, and a grip connected in sequence;
    the interior of the control compartment shell is used for accommodating the control apparatus, the interior of the detection head cover is used for accommodating the detection apparatus, and the interior of the battery compartment cover is used for accommodating a battery compartment;
    a portion of the coupling portion in contact with the control compartment shell and a portion of the coupling portion in contact with the detection head cover are provided with annular grooves along an outer periphery of the coupling portion, O-shaped seal rings are mounted in the annular grooves, the portions of the coupling portion extend into the detection head cover and the special-shaped compartment and fit tightly, and the portions of the coupling portion extending into the detection head cover and the special-shaped compartment are provided with jackscrews;
    a portion of the special-shaped compartment in contact with the control compartment shell is provided with an annular groove with an O-shaped seal ring, and an outer periphery of the special-shaped compartment is concave to form a plurality of tables for mounting of watertight joints; the sensing apparatus is disposed in the special-shaped compartment and leads out wires by means of the watertight joints;
    a middle position of the control compartment cover is concave to form an accommodation slot for accommodating a male socket plug connected to the battery compartment cover; a middle position of the battery compartment cover is concave to form an accommodation slot for accommodating a female socket plug in plugged connection with the male socket plug; an O-shaped seal ring is disposed between connecting portions of the battery compartment cover and the battery compartment shell, and a battery platform is provided inside the battery compartment cover for placement of a battery; and an O-shaped seal ring and a jackscrew are provided at a connecting position of one end of the compartment cover transition section and the battery compartment shell, and the grip is provided at the other end of the compartment cover transition section.

6. The underwater submersible robot according to claim 5, characterized in that the alloy skeletons comprise head skeletons, middle skeletons, and tail skeletons disposed in sequence along the lengthwise direction of the main body compartment; the head skeletons, the middle skeletons and the tail skeletons are connected to two ends of two sides of the main body compartment respectively by means of the coupling portion, and the main body compartment is connected to the corresponding streamlined shells by means of the head skeletons, the middle skeletons and the tail skeletons; and an expansion skeleton is disposed at a bottom of the main body compartment, and holes are reserved in the expansion skeleton for mounting of an expansion module.

7. The underwater submersible robot according to claim 1, characterized in that the underwater submersible robot further comprises a mounting bottom plate and at least two adaptive magnetization modules;

the mounting bottom plate is used for being removably connected to the fuselage, and the at least two adaptive magnetization modules are connected to two sides of the mounting bottom plate;

each of the adaptive magnetization modules comprises: a lifting plate, a first small hydraulic rod, a second small hydraulic rod, a magnetization fixing module, a bearing plate, a second large hydraulic rod, a first large hydraulic rod, an adaptive adjustment holding mechanism, and a bottom connecting skeleton;

an included angle formed by each of two sides of the bearing plate and a middle position of the bearing plate is an obtuse angle, and bottom sides of the two sides of the bearing plate are each connected to the magnetization fixing module by means of at least one set of first small hydraulic rod and second small hydraulic rod; the first small hydraulic rod is connected to the second small hydraulic rod in a hydraulic driving manner; and top sides of the two sides of the bearing plate are each connected to the mounting bottom plate by means of at least one set of second large hydraulic rod and first large hydraulic rod, and the first large hydraulic rod is connected to the second large hydraulic rod in a hydraulic driving manner.

8. The underwater submersible robot according to claim 1, characterized in that the underwater submersible robot further comprises two pairs of motion assisting modules disposed on two sides of the fuselage; and each of the motion assisting modules comprises a fixing support, a motor, and a spoiler, wherein the fixing support is disposed on one side of the fuselage, the spoiler is disposed on the fixing support in a manner of rotating up and down, and the motor is disposed on the fuselage and used for driving the spoiler to move up and down.

9. The underwater submersible robot according to claim 1, characterized in that the detection apparatus comprises an underwater vision matrix module; the underwater vision matrix module comprises: a matrix collar and at least two camera adjustment assemblies; the matrix collar is used for being removably mounted on the fuselage, and the at least two camera adjustment assemblies are uniformly distributed on a same side of the matrix collar; and each of the camera adjustment assemblies comprises: a linear actuator, a clamping plate, a waterproof motor, a waterproof camera, a motion frame, and a hinged motion frame, wherein a bottom end of the hinged motion frame is hinged to the matrix collar, a top end of the hinged motion frame is provided with the waterproof motor, a free end of a rotating shaft of the waterproof motor is provided with the waterproof camera, one end of the clamping plate is connected to a middle position of the hinged motion frame, the other end of the clamping plate is connected to one end of the motion frame, the other end of the motion frame is connected to one end of the clamping plate of another camera adjustment assembly, the other end of the clamping plate of another camera adjustment assembly is connected to the middle position of the hinged motion frame of the camera adjustment assembly, the linear actuator is disposed on the matrix collar, and a free end of a push rod of the linear actuator is connected to a middle position of the motion frame.

10. The underwater submersible robot according to claim 1, characterized in that the underwater submersible robot further comprises a variable stiffness flexible hoop self-stabilizing module; the variable stiffness flexible hoop self-stabilizing module comprises a main fixing frame, a pair of hydraulic mechanical claws, variable stiffness cladding arrays, gap-filling cladding inflatable units, and carbon fiber interlayers; and the main fixing frame is used for being removably connected to the fuselage, the pair of hydraulic mechanical claws are disposed on two sides of the main fixing frame respectively in a manner of moving close to or away from each other, the variable stiffness cladding arrays are disposed on two sides of free ends of inner sides of the pair of hydraulic mechanical claws, the gap-filling cladding inflatable units are disposed in middle positions of the inner sides of the pair of hydraulic mechanical claws, and the gap-filling cladding inflatable units are covered with the carbon fiber interlayers.

* * * * *